US006959042B1

(12) United States Patent
Liu et al.

(10) Patent No.: US 6,959,042 B1
(45) Date of Patent: Oct. 25, 2005

(54) METHODS AND APPARATUS FOR MEASURING COMPRESSED VIDEO SIGNALS AND APPLICATIONS TO STATISTICAL REMULTIPLEXING

(75) Inventors: Hain-Ching Liu, Fremont, CA (US); Ji Zhang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 486 days.

(21) Appl. No.: 09/969,434

(22) Filed: Oct. 1, 2001

(51) Int. Cl.[7] .............................. H04N 7/12; H04N 1/12
(52) U.S. Cl. ................................................ 375/240.02
(58) Field of Search ........................ 348/390.1, 388.1, 348/384.1, 394.1, 420.1; 375/240.01, 240.02, 375/240.08, 240.12, 240.26, 240.16; 382/232, 382/235, 236

(56) References Cited

U.S. PATENT DOCUMENTS

| | | | |
|---|---|---|---|
| 5,600,366 A * | 2/1997 | Schulman .................... | 725/36 |
| 5,861,919 A | 1/1999 | Perkins et al. | |
| 5,862,140 A | 1/1999 | Shen et al. | |
| 6,055,270 A * | 4/2000 | Ozkan et al. .......... | 375/240.03 |
| 6,192,083 B1 | 2/2001 | Linzer, et al. | |
| 6,310,915 B1 * | 10/2001 | Wells et al. ........... | 375/240.03 |
| 6,449,392 B1 * | 9/2002 | Divakaran et al. .......... | 382/235 |
| 6,466,624 B1 * | 10/2002 | Fogg ..................... | 375/240.27 |
| 6,483,543 B1 * | 11/2002 | Zhang et al. ............ | 348/390.1 |
| 6,570,922 B1 * | 5/2003 | Wang et al. ........... | 375/240.12 |
| 6,647,061 B1 * | 11/2003 | Panusopone et al. .. | 375/240.12 |
| 2001/0002921 A1 * | 6/2001 | Bagni et al. ........... | 375/240.16 |
| 2002/0172283 A1 * | 11/2002 | Kawakatsu et al. .... | 375/240.13 |

OTHER PUBLICATIONS

International Organisation for Standardisation Organisation Internationale De Normalisation, "Generic Coding of Moving Pictures and Associated Audio: Systems", ISO/IEC JTC1/SC29/WG11/N0801, Nov. 13, 1994.

Huifang Sun, "Architectures for MPEG Compressed Bitstream Scaling", IEEE Transactions on Circuits and Systems for Video Technology, vol. 6, No. 2, Apr. 1996, pp. 191-199.

Wei Ding, "Joint Encoder and Channel Rate Control of VBR Video over ATM Networks", IEEE Transactions on Circuits and Systems for Video Technology, vol. 7, No. 2, Apr. 1997, pp. 266-278.

* cited by examiner

*Primary Examiner*—Chris Kelley
*Assistant Examiner*—Behrooz Senfi
(74) *Attorney, Agent, or Firm*—Beyer Weaver & Thomas LLP

(57) ABSTRACT

The present invention relates to systems and methods for applying information obtained from compressed video data to statistical remultiplexing. A compressed bitstream including compressed video data is received. The compressed video data is then parsed. One or more compression statistics are then generated from the parsed compressed video data. Information associated with the compression statistics is then provided to a statistical remultiplexer.

9 Claims, 17 Drawing Sheets

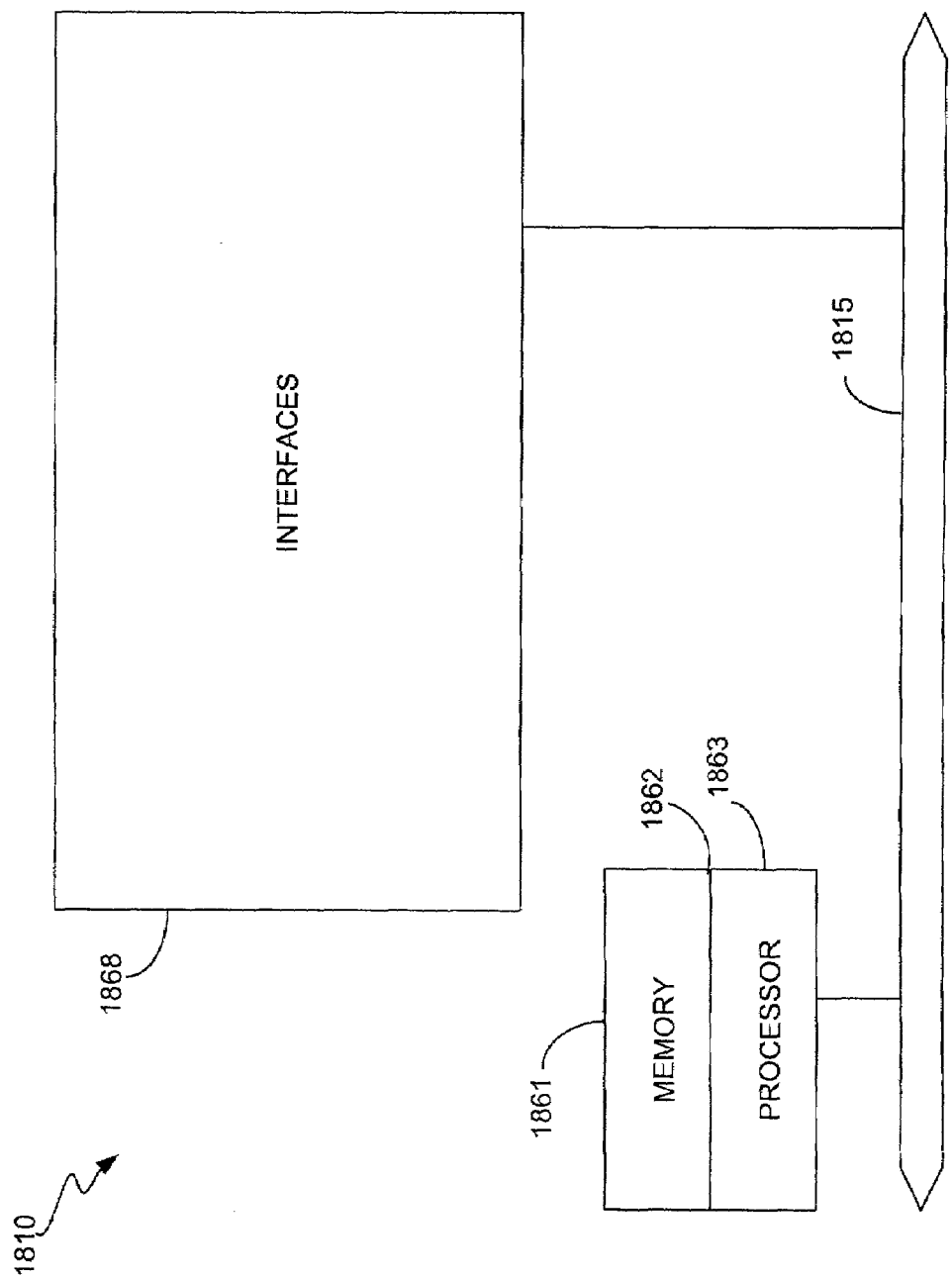

METHODS AND APPARATUS FOR MEASURING COMPRESSED VIDEO SIGNALS AND APPLICATIONS TO STATISTICAL REMULTIPLEXING

BACKGROUND OF THE INVENTION

1. Field of the Invention

The present invention relates generally to systems and methods for controlling the statistical remultiplexing process. More specifically, the present invention relates to measuring the complexity of compressed digital video signals and the application of such measurements to the statistical remultiplexing process.

2. Description of the Related Art

Video services are provided by a wide array of video content suppliers. For example, residential digital video services may include digital television, video on demand, Internet video, etc.—each service having hundreds of programs. A program refers to one or more bitstreams that are used to represent the video content and associated audio content. A target receiver for the programs, such as a set-top box (STB) located in a residential home, receives video programs from a number of different video content suppliers via assorted transmission channels. Typically, the 'last mile' of transmission between the video content suppliers and the target receiver is along the same transmission channel, requiring the channel to carry multiple video programs from the wide array of suppliers—and often simultaneously.

There are presently a variety of different communication channels for transmitting or transporting video data. For example, communication channels such as coaxial cable distribution networks, digital subscriber loop (DSL) access networks, ATM networks, satellite, terrestrial, or wireless digital transmission facilities are all well known. In fact, many standards have been developed for transmitting data on the communication channels. For the purposes herein, a channel is defined broadly as a connection facility to convey properly formatted digital information from one point to another. A channel includes some or all of the following elements: 1) physical devices that generate and receive the signals (modulator/demodulator); 2) medium that carries the actual signals; 3) mathematical schemes used to encode and decode the signals; 4) proper communication protocols used to establish, maintain and manage the connection created by the channel 5) storage systems used to store the signals such as magnetic tapes and optical disks. The concept of a channel includes but is not limited to a physical channel, but also logical connections established on top of different network protocols, such as xDSL, ATM, IP, wireless, HFC, coaxial cable, Ethernet, Token Ring, etc.

The channel is used to transport a bitstream, or a continuous sequence of binary bits used to digitally represent compressed video, audio and/or data. A bit rate is the number of bits per second that is required to transport the bitstream. A bit error rate is the statistical ratio between the number of bits in error due to transmission and the total number of bits transmitted. A channel capacity is the maximum bit rate at which a given channel can convey digital information with a bit error rate no more than a given value.

Since transmission of video data with existing communication channels is often excessive, compression is an approach that has been used to make digital video images more transportable. Digital video compression allows digitized video data to be represented in a much more efficient manner and makes it possible to transmit the compressed video data using a channel at a fraction of the bandwidth required to transmit the uncompressed video data. For example, a digitized video data having an uncompressed bit rate of roughly 120 million bits per second (Mbps) can be represented by a compressed bitstream having a bit rate of 4–6 Mbps. Compression represents in significant data savings which results in much more efficient use of channel bandwidth and storage media.

When the digital video is first compressed, the encoder assumes a particular bit rate profile, whether it is constant bit rate (CBR) or a variable bit rate (VBR). The word "profile" refers to the fact that transport bit rate may not be constant, but variable under certain constraints, such as peak bit rate, average bit rate, minimum bit rate, etc. For example, a constant bit rate stream at 4 Mbps does not have the same bit rate profile as a variable bit rate stream at an average of 4 Mbps but has larger maximum bit rate and smaller minimum bit rate, respectively.

The VBR representation of compressed video data allows a video encoder to generate compressed bitstreams that, when decoded, produce consistent video quality. However, as a result of the compression process, the number of bits required to represent the compressed data differs widely from picture to picture. The specific VBR characteristics of the compressed bitstream depends on the complexity of the video image, amount of motion in the video sequence, as well as changes made in post-generation such as scene cuts, fades, wipes, picture-in-picture, etc. As channel capacities are often expressed as constant bit rates, the variable nature of VBR compressed bitstream often poses a problem for video transmission.

One potential consequence of exceeding channel capacity for a VBR compressed bitstream on a particular channel is compromised video quality. Commonly, if one or more bitstreams is too large to fit within a channel, video data may be dropped from the bitstream or simplified to allow transmission; thus sacrificing end user video quality. Due to the real-time nature of compressed video transmission, dropped packets are not re-transmitted. Also, it is important to point out that compressed bitstreams are usually generated by either real-time encoders or pre-compressed video server storage systems. Both are likely to be in a remote site, away from the network itself. This increases the difficulty in encoding the video signal with a resulting bit rate profile sensitive to the connection bandwidth available for a particular channel or target receiver.

To further reduce the excessive amount of video transmission, bitstreams are frequently combined for transmission within a channel to make digital video data more transportable. A multiplex is a scheme used to combine bitstream representations of multiple signals, such as audio, video, or data, into a single bitstream representation. A re-multiplex is a scheme used to combine multiple bitstream representations of multiplexed signals into a single bitstream representation.

One important benefit of the VBR compression is achieved through the so-called 'statistical multiplexing'. Statistical multiplexing is an encoding and multiplexing process which takes advantage of the VBR nature of multiple compressed video signals. When a statistical multiplexer combines multiple bitstreams, an algorithm may be used to adapt the bit rate of each VBR video signal but the total bit rate of the output multiplex is kept at a constant value. Statistical multiplexing encompasses multiplexing architecture having a reverse message path from the multiplexer to the encoders. This is also often referred to closed-loop statistical multiplexing.

FIG. 1A illustrates a high level architecture for a conventional closed-loop statistical multiplexer (statmux) 10. The closed-loop statmux 10 has a closed-loop signal path 11 between a statmux rate controller 12 and program encoders 14 and 16. The signal path 11 provides the rate controller 12 with a global view of the bit rate requirements for each of the program encoders 14 and 16 and allows communication between the rate controller 12 and each encoder. The encoders 14 and 16 provide compressed video, audio and data bitstreams to a multiplexer 15, which schedules the compressed bitstreams to output a multiplexed compressed bitstream 18. Each of the encoders 14 and 16 does not have knowledge of the bandwidth requirements of data being encoded by the other encoder and hence relies on messages sent by the rate controller 12. Based on these messages received from the statmux rate controller 12, the program encoders 14 and 16 adjust their encoding bit rate. Since the closed-loop statmux 10 relies on prompt delivery of the messages between the statmux rate controller 12 and the encoders 14 and 16, the closed-loop statmux 10 usually requires co-location of all program encoders 14 and 16, the rate controller 12 and multiplexer 15.

Statistical re-multiplexing, also called open-loop statistical multiplexing, or statistical rate re-multiplexing, is a process which performs statistical multiplexing of signals already in compressed format. Thus, statistical re-multiplexing includes accepting multiple VBR bitstreams and outputting a single CBR bitstream that fits within an available channel. In applications such as video on demand, digital cable headend systems, and digital advertisement insertion systems, statistical re-multiplexing may improve the overall system efficiency, resulting in better bandwidth usage and reduced transmission cost.

A conventional open-loop statistical re-multiplexer (stat remux) architecture 20 is illustrated in FIG. 1B. The architecture 20 includes an open-loop statistical re-multiplexer 21 that accepts compressed digital bitstreams consisting of multiple video/audio/data programs from encoders 22 and 24. The benefit of the open-loop stat remux architecture 20 is that it does not require reverse signal paths to the program encoders 22 and 24.

Functionally, the statistical re-multiplexer 21 does not control the bit rate output of each of program encoders 22 and 24. Although closed-loop statistical re-multiplexing can be highly efficient in bandwidth sharing among multiple encoded video/audio programs, it is not well suited for bandwidth sharing of multiple program encoders distributed over a large geographic area, or when multiple program streams are encoded and stored at different times. Even if such a reverse signal path exists, it must have low delay, and the program encoders 22 and 24 must be able to receive and correctly interpret the messages. Correct interpretation of the messages is often prevented when program encoders 22 and 24 in different geographic locations are not produced by the same manufacturer and implement different signal interfaces. Thus, network devices transmitting multiple video bitstreams typically use the open-loop stat remux architecture 20.

Unfortunately, the open-loop stat remux architecture 20 relies on information solely contained in the pre-compressed bitstreams for re-encoding. This reliance poses some limitations. One limitation is that the stat remux 21 cannot obtain information on the video signals within each compressed bitstreams it receives without completely decoding the signal back to the spatial domain (baseband). When the stat remux 21 is configured within a network device such as a router or headend, this complete decoding increases complexity of the network device, slows transmission of the video data, and decreases transmission efficiency. Any of these may diminish end-user video quality. Accordingly, it would be beneficial if information regarding the underlying video signals and associated picture could be ascertained from the compressed bitstreams without decoding the signals.

International standards have been created for various video compression schemes. These include MPEG-1, MPEG-2, MPEG-4, H.261, H.262, H.263, H.263+, etc. These standardized compression schemes rely on several algorithm schemes such as motion compensated transform coding (for example, DCT transforms or wavelet/sub-band transforms), quantization of the transform coefficients, and variable length coding (VLC). The motion compensated encoding removes the temporally redundant information in video sequences. The transform coding enables orthogonal spatial frequency representation of spatial domain video data. Quantization of the transformed coefficients reduces the number of levels required to represent a given digitized video. The other factor contributing to the compression is the use of variable length coding (VLC) so that most frequently used symbols are represented by the shortest code word. In general, the number of bits used to represent a given image determines the quality of the decoded picture. The more bits used to represent a given image, the better the image quality. The system that is used to compress digitized video sequence using the above-described schemes is called an encoder or encoding apparatus.

Commonly, transmission of video data is intended for real-time playback. This implies that all of the information required to represent a digital picture must be delivered to the destination in time for decoding and display in a timely manner. The channel must be capable of making such a delivery. However, a channel imposes a bit rate constraint for data being sent through the channel. This bit rate constraint often falls below the bit rate required to transport the compressed video bitstream. Thus, there is often a need to scale the transmission bandwidth required for the video data in order to fit within the available bandwidth of a network connection, or channel. This is often accomplished through compression through a compression scheme such as MPEG.

1. MPEG Packet Structure

FIG. 2 illustrates a compressed bitstream 60 having an MPEG-2 format. The MPEG-2 compression standard consists of two layers: a system layer 61 an elementary stream layer 62. The system layer 61 comprises two sub layers: a packetized elementary stream (PES) layer 64 and a packet layer 65 above the PES layer 64. The packet layer 65 can be either a transport stream 66 or a program stream 68. For compressed video and audio data, the data follows a hierarchical structure, namely, the elementary stream is contained in the PES payload, and the PES packets are contained in the packet layer payload.

The elementary stream layer 62 typically contains the coded video and audio data. It also defines how compressed video (or audio) data are sampled, motion compensated (for video), transform coded, quantized and represented by different variable length coding (VLC) tables. The basic structure for a coded video picture data is a block that is an 8 pixel by 8 pixel array. Multiple blocks form a macroblock, which in turn forms part of a slice. A coded picture consists of multiple slices. Multiple coded pictures form a group of pictures. Such hierarchical layering of data structures localizes the most basic processing on the lowest layer, namely blocks and macroblocks.

Each block contains variable length codes (VLC) for DCT coefficients. In the MPEG-2 syntax, the picture data section contains the bulk of the compressed video images. This is where the DCT coefficients are encoded as VLCs. For a typical bitstream, this portion of the data takes somewhere between 70%–90% of the total bit usage of a coded picture, depending on the coded bit rate.

The next layer is the system layer 61. The system layer 61 is defined to allow an MPEG-2 decoder to correctly decode audio and video data, and present the decoded result to the video screen in time continuous manner. The system layer 61 consists of two sublayers. The first sublayer in the system layer 61 is the PES layer 64. The PES layer 64 defines how the elementary stream layer is encapsulated into variable length packets called PES packets. In addition, the PES layer 64 may include presentation and decoding timestamps for the PES packets, which are used by a decoder to determine the timing to decode and display the video images from the decoding buffers.

The transport layer 65 defines how the PES packets are further packetized into fixed sized transport packets, e.g. packets of 188 bytes to produce a transport stream. Additional timing information and multiplexing information may be added by the transport layer 65. The transport stream 66 is optimized for use in environments where errors are likely such as transmission in a lossy or noisy media. Applications using the transport stream 66 include Direct Broadcast Service (DBS), digital or wireless cable services, broadband transmission systems, etc. The program stream 68 defines how the PES packets are encapsulated into variable sized packets and may also include additional timing in multiplexing information. The program stream 68 is designated for use in relatively error free environments and is suitable for applications that may involve software processing of system information such as interactive multimedia applications. Applications of program stream 68 include Digital Versatile Disks (DVD) and video servers.

Video data can be contained in the elementary stream (ES), which means that no PES, transport or program system layer information is added to the bitstream. The video data can also be contained in the PES stream 64, transport stream 66 or program stream 68. For a given video bitstream, the difference between these different layers lies in the timing information, multiplexing information and other information not directly related to the re-encoding process. In one embodiment, the information required to perform re-encoding is contained in the elementary stream layer. However, the present invention is not limited to bitstreams in the elementary stream layer. In other words, the present invention can be extended to the PES stream, transport stream or program stream as one of skill in the art will appreciate.

FIG. 3 is a diagram illustrating an MPEG elementary video bitstream. The MPEG elementary video bitstream 340 includes start code indicating processing parameters for the bitstream 340 such as a sequence start code 342, a sequence extension including a user data header 343, a Group of Pictures (GOP) header 344, a user data header 345, a picture header 346, and a picture coding extension that includes a user data extension 347. Picture data 348 follows the picture header 346. The bitstream 340 includes a second picture header 350 preceding picture data 352.

2. MPEG Compression Stages

Statistical remultiplexing includes recoding. Recoding is decoding followed by subsequent encoding (usually with a change of some sort). FIG. 4 illustrates an exemplary block diagram of the processing required for complete recoding 160. Recoding in this case begins by receiving compressed video data (161). The video data is then decoded comprising variable length decoding 162, de-quantization 164, inverse transform coding 166 and motion compensation 168. Variable length coding (VLC) allows the most frequently used symbols to be represented by the shortest code word. Quantization of the transformed coefficients reduces the number of levels required to represent a given digitized video. Quantization has a direct effect on the compressed bit usage and decoded video quality. The transform coding (DCT) enables orthogonal spatial frequency representation of spatial domain video data. Motion compensation 166 includes an iterative process where I, P and B frames are reconstructed using a framestore memory 170.

Recoding includes encoding by processing the video data with transform coding 172, re-quantization 174, and VLC encoding 176. After transform coding 172 and re-quantization 174, each image is decoded comprising de-quantization 178 and inverse transform coding 180 before motion compensation 182 with motion vectors provided by motion estimation 186. Motion estimation 186 is applied to generate motion vectors on a frame by frame basis. More particularly, a motion vector indicates an amount of movement of a macro block in an X or Y direction. Motion compensation 182 includes an iterative process where I, P and B frames are reconstructed using a framestore memory 184. Motion compensation 182 produces a predicted picture that is summed 186 with the next decoded picture 188 and encoded by transform coding 172, re-quantization 174, and VLC encoding 176. This iterative process of motion compensation 182 including generation of motion vectors by motion estimation 186 produces compressed video data 190 having a lower bit rate than received (161).

For many compressed video bitstream schemes, it is possible to change the bit rate of a bitstream by changing the quantization step value. This approach is called re-quantization. For bit rate reduction of the video data, re-quantization 174 is performed with a larger quantization step value. The re-quantized compressed video data 190 may then be combined with other re-quantized compressed video data and transmitted onto a channel. The re-quantization scheme 160 is advantageous if the resolution of the video data is also to be changed, e.g., to further reduce the bit rate. As the amount of data in the compressed bit stream is reduced, the bit rate that is required for transmitting the low resolution bit stream is also reduced.

3. MPEG Frame Types

Information in a compressed bit stream also indicates the relationship between various frames within a picture. The access unit level information relates to coded pictures and may specify whether a picture is an intra frame (I frame), a predicted frame (P frame), or a bi-directional frame (B frame). An I frame contains full picture information. A P frame is constructed using a past I frame or P frame. A bi-directional frame (B frame) is bi-directionally constructed using both a past and a future I or P frame, which are also called anchor frames.

FIG. 5 illustrates an exemplary frame sequence 300 included in a compressed bitstream. The sequence 300 corresponds to a group of pictures in an MPEG-2 bitstream. The sequence 300 includes an initial I frame 302, P frames 304*a–d* and ten B frames 306*a–j*. The I frame 302 contains full picture information. The P and B frames are constructed from other frames as illustrated by arrows 308. Each P frame 304*a–c* is constructed using the I frame 302 or a previous P frame 304*a–c*, whichever immediately precedes the P frame (e.g., the P frame 304*b* uses the P frame 304*a*). The B frames 306*a–j* are bi-directionally constructed using the nearest past and future reference picture. A reference picture is either an I or a P picture. For example, the B frames 306*a* and 306*b* are constructed using the past I frame 302 and future P frame 304*a*. It would be desirable if such access unit level information could be leveraged during the statistical remultiplexing process.

Based on the foregoing, improved methods and systems for applying information obtained from compressed video signals to a statistical remultiplexer would be desirable.

SUMMARY OF THE INVENTION

The present invention relates to systems and methods for applying information obtained from compressed video data to statistical remultiplexing. This is accomplished, in part, through generating compression statistics from the compressed video data without completely decoding the compressed video data. In this manner, the statistical remultiplexing process may be improved.

In accordance with one aspect of the invention, a compressed bitstream including compressed video data is received. The compressed video data is then parsed. One or more compression statistics are then generated from the parsed compressed video data. Information associated with the compression statistics is then provided to a statistical remultiplexer.

Various compression statistics may be generated from the compressed video data. For instance, compression statistics may be generated from motion vectors. In addition, scene change detection may be performed through the collection of DC components of DCT coefficients as well as through counting the number of intra macroblocks and/or inter macroblocks. Similarly, fade/dissolve detection may be performed through the collection of DC components of DCT coefficients. Other compression statistics include the number of bits per picture, detecting a change in bit rate, quantization step size, picture complexity, picture type, number of non-zero DCT coefficients, detection of a cue-tone, and detecting a change in picture resolution.

These and other features and advantages of the present invention will be described in the following description of the invention and associated figures.

BRIEF DESCRIPTION OF THE DRAWINGS

FIG. 18 is a block diagram of a router that may be used in conjunction with the methods of the present invention.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In some instances, well known process steps and/or structures have not been described in detail in order to not unnecessarily obscure the present invention.

Figure 1A:
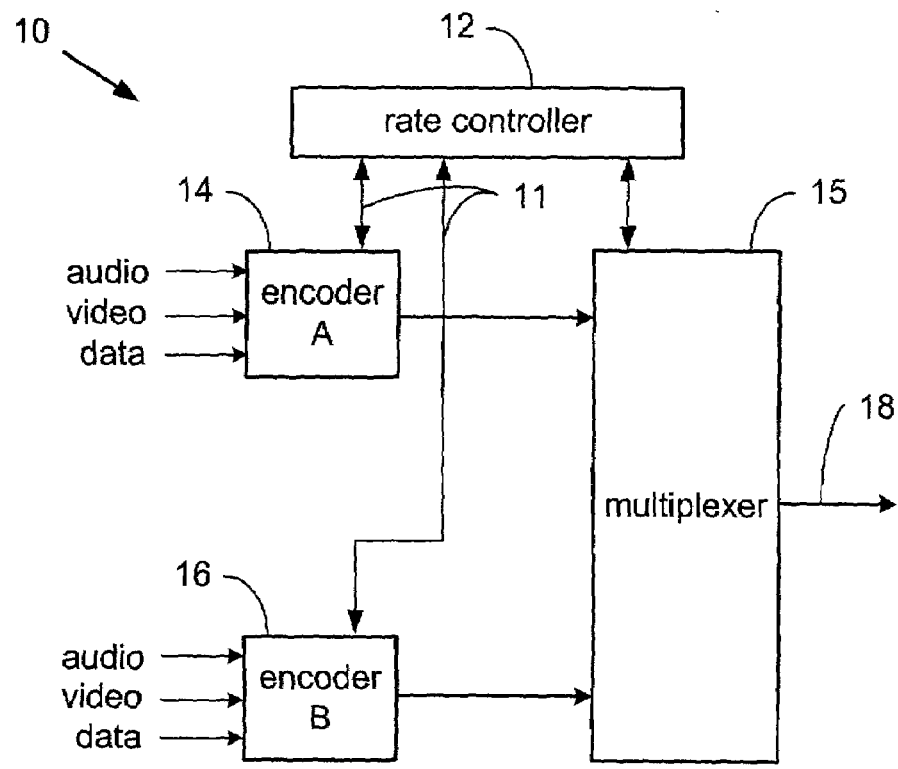
FIG. 1A illustrates a high level architecture for a conventional closed-loop statistical multiplexer.
Figure 1B:
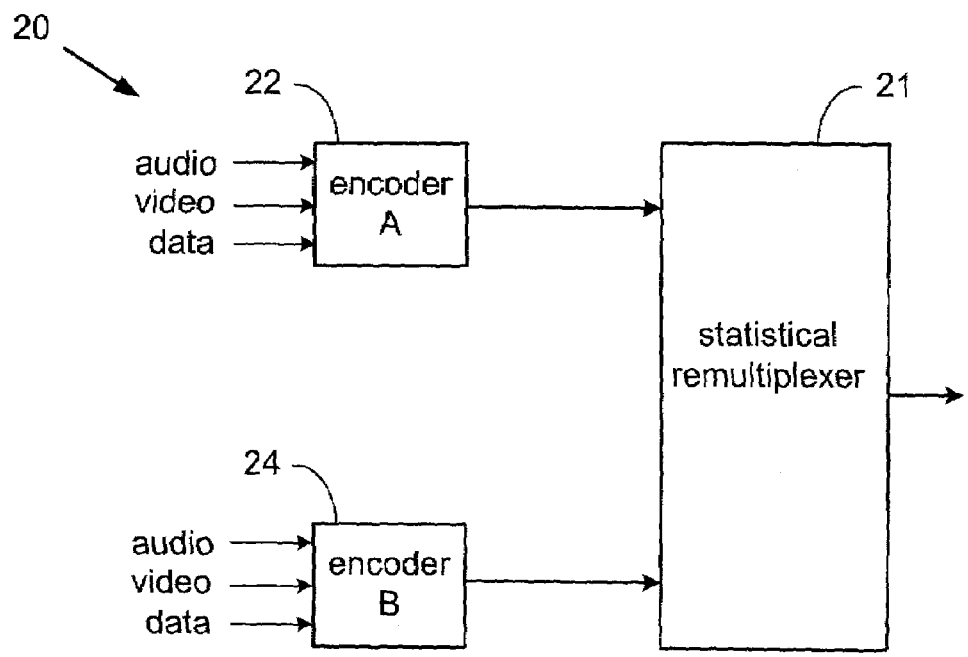
FIG. 1B illustrates a high level architecture for a conventional open-loop statistical re-multiplexer architecture.
Figure 2:
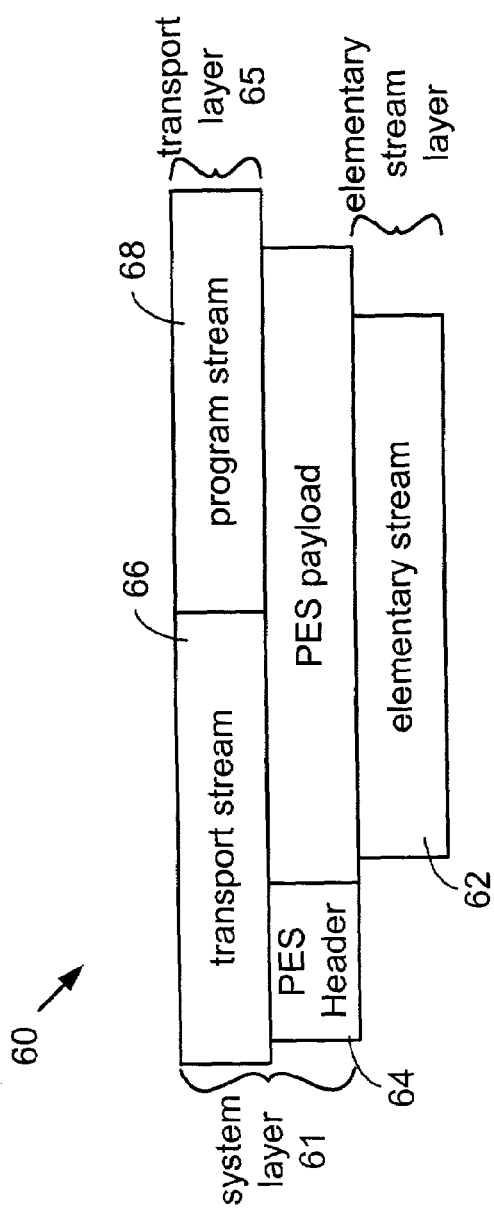
FIG. 2 is a diagram illustrating a compressed bitstream having an MPEG-2 format.
Figure 3:
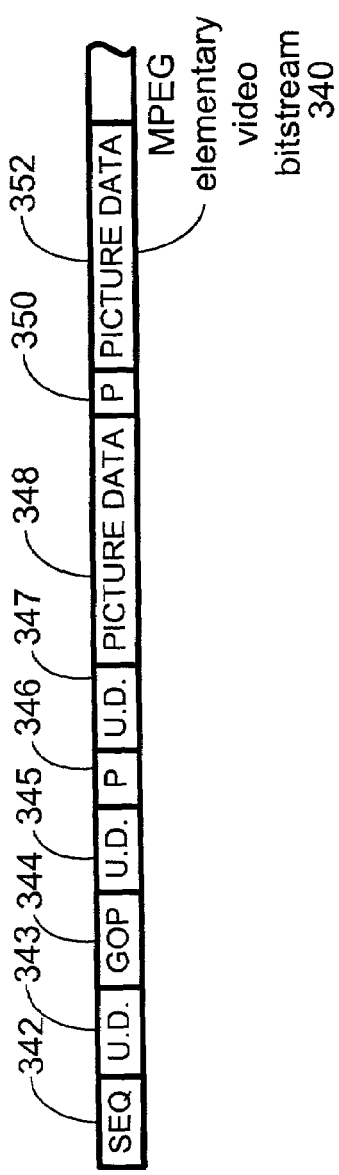
FIG. 3 is a diagram illustrating an MPEG elementary video bitstream.
Figure 4:
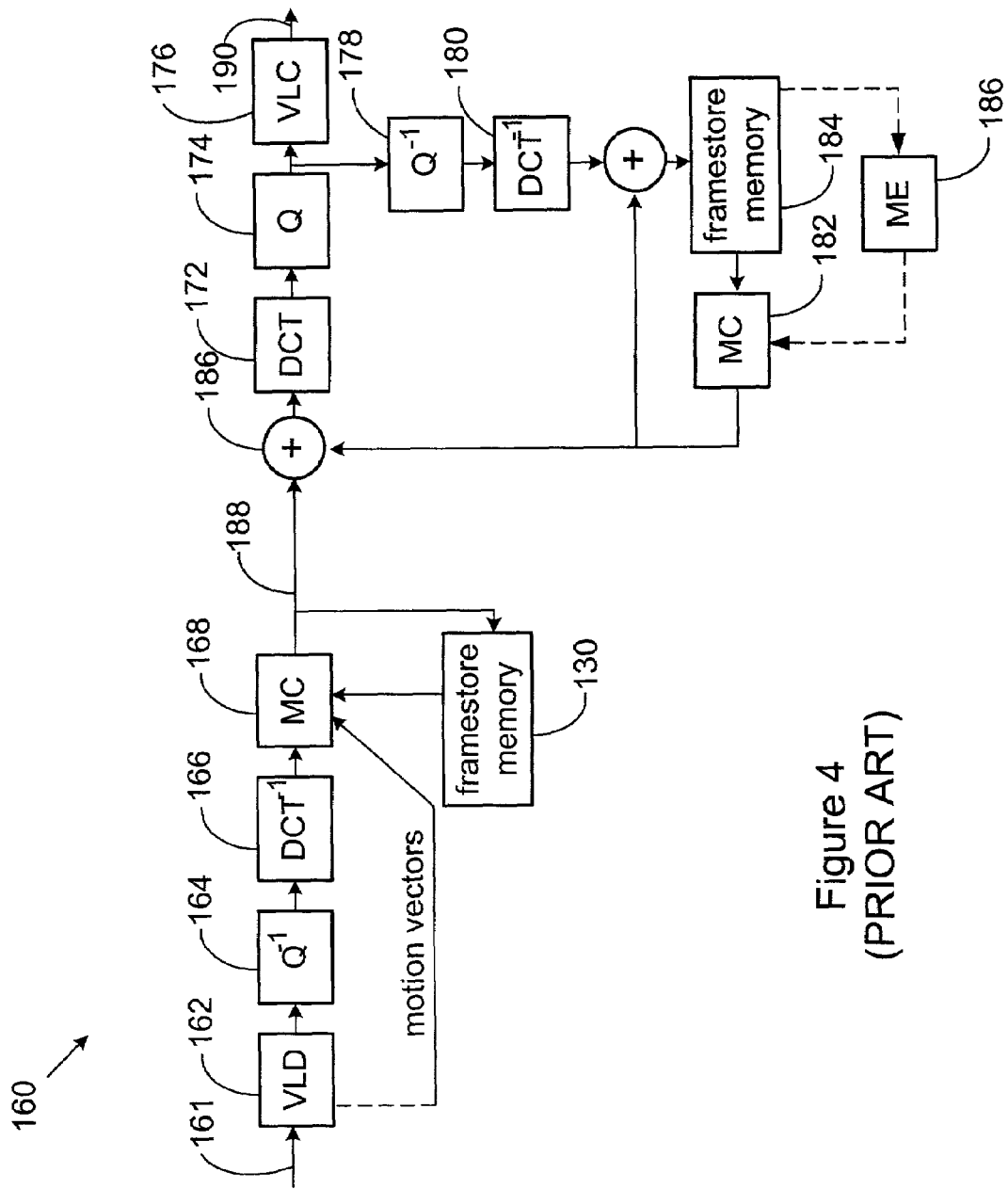
FIG. 4 is a diagram illustrating an exemplary block diagram of the processing required for recoding.
Figure 5:
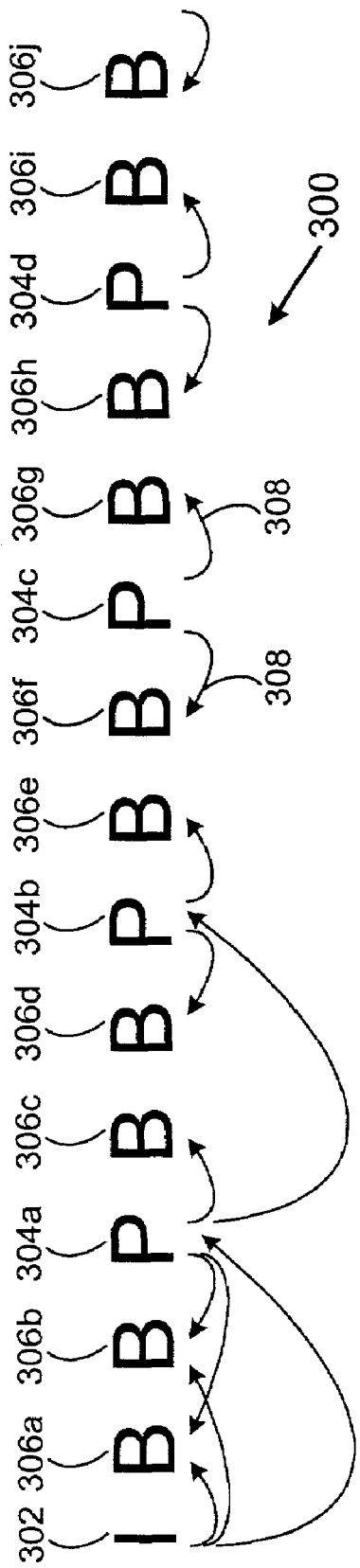
FIG. 5 is a diagram illustrating an exemplary frame sequence included in a compressed bitstream.
Figure 6:
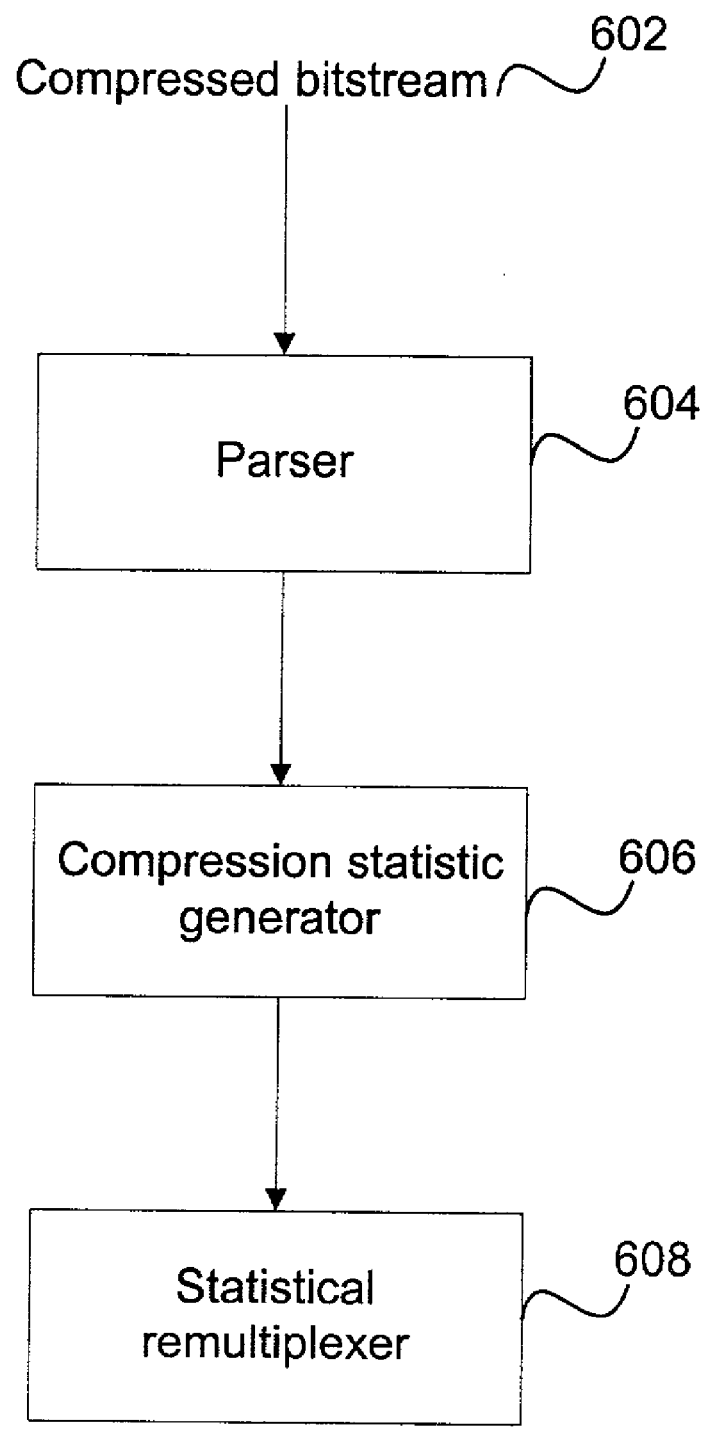
FIG. 6 is a diagram illustrating an exemplary system in which the present invention may be implemented.

FIG. 6 is a diagram illustrating an exemplary system in which the present invention may be implemented. As shown, a compressed bitstream 602 is parsed by parser 604. More particularly, the compressed bitstream 602 is parsed without complete decoding. The parsed information obtained from the compressed bitstream is then provided to a compression statistic generator 606. The compression statistic generator extracts various compression statistics from the compressed bitstream and provides the statistics to a statistical remultiplexer 608. The statistical remultiplexer 608 may then use these statistics to simplify its processing. By separating the parser 604 from the statistical remultiplexer 608 (and associated recoding module) it is possible to achieve look-ahead processing capability. In this manner, the recoding module will have much better knowledge of the video requiring processing in the future, thereby resulting in improved video processing and quality.

Figure 7:
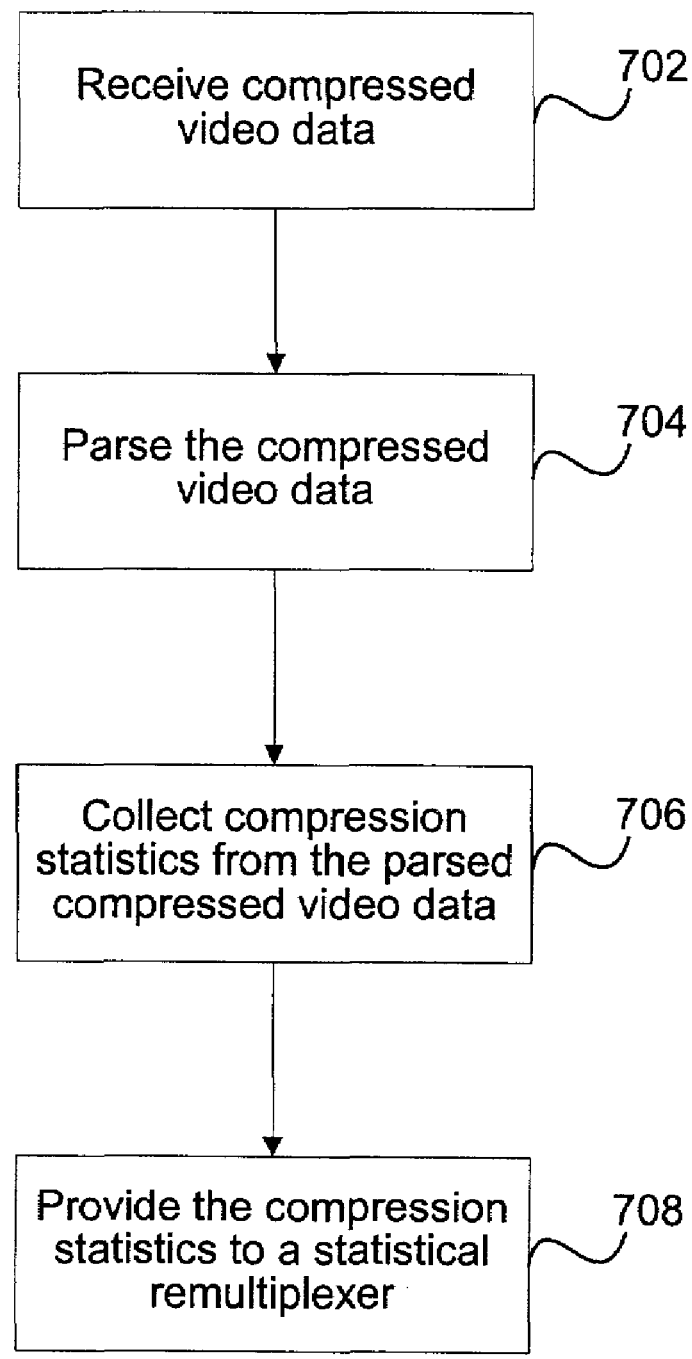
FIG. 7 is a process flow diagram illustrating a method of collecting statistics from compressed video data and applying the statistics in statistical remultiplexing.

One method of collecting statistics from compressed video data and applying the statistics in statistical remultiplexing is illustrated in FIG. 7. As shown, compressed video data is received at block 702. The compressed video data is preferably parsed at block 704 and compression statistics are collected from the parsed video data at block 706. The compression statistics may then be provided to a statistical remultiplexer at block 708. Thus, the statistical remultiplexer is preferably adapted for interpreting the compression statistics and modifying its processing accordingly.

Often, there is a close correlation between the motion vectors and the direction of the actual motion within the video sequence. However, it should be noted that motion estimation in MPEG video compression is not intended to estimate the motion content of the video data, but intended to minimize the difference between the reference frame and the motion estimated frame. In other words, the motion vectors do not necessarily point to the direction of motion but to the direction of the motion estimated macroblock with the smallest residual difference. Thus, it is desirable to obtain a compression statistic based upon the motion vectors.

Figure 8:
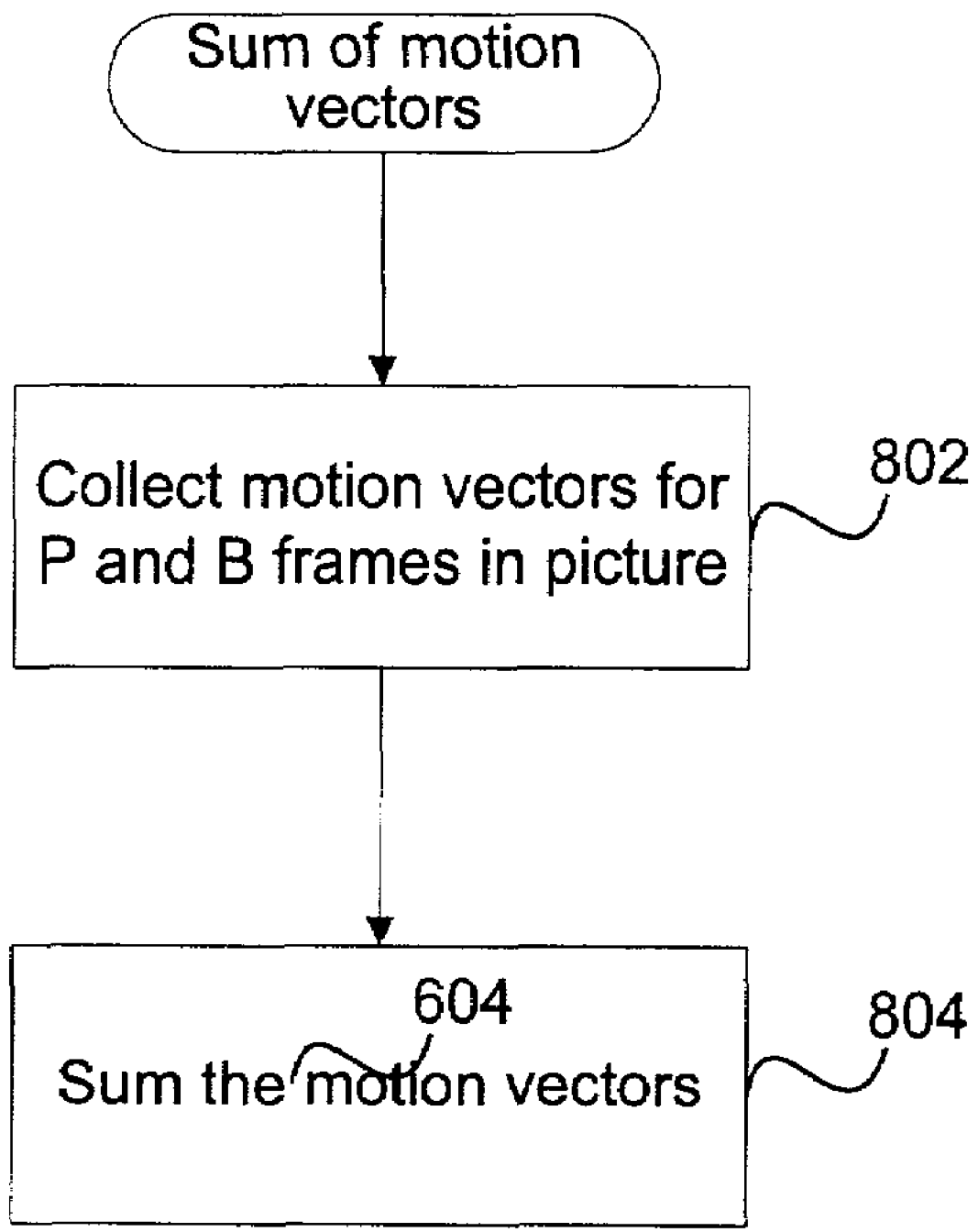
FIG. 8 is a process flow diagram illustrating a method of collecting statistics as shown at block 706 of FIG. 7 to obtain a sum of motion vectors in accordance with one embodiment of the invention.

FIG. 8 is a process flow diagram illustrating a method of collecting statistics as shown at block 706 of FIG. 7 to obtain a sum of motion vectors in accordance with one embodiment of the invention. As described above, motion vectors are embedded in the compressed bit stream. More particularly, a motion vector indicates an amount of movement of a macro block in an X or Y direction. However, only P and B frames may have associated motion vectors. Thus, as shown at block 802, one or more motion vectors are collected for P and B frames within each macro block of the picture. The motion vectors are then summed at block 804. The sum of motion vectors obtained at block 804 is preferably the sum of absolute (unsigned) values of motion vectors in horizontal (X) and vertical (Y) directions. For example, the absolute horizontal (X) and absolute vertical (Y) measures for the two motion vectors (−2,3) and (5,4) are 7 and 7, respectively. These motion vector sums are useful, since the size of the sum may be used to track overall movement within a picture. For instance, a large sum may indicate that all vectors point in the same direction. In other words, a large sum indicates movement in a particular direction. Similarly, a small sum may indicate random motion within a picture.

In addition to the two separate motion vectors corresponding to the horizontal (X) and vertical (Y) directions, motion measure information may be obtained from the sum of the set of motion vectors to describe the amount of motion in a video sequence. A first motion measure is the sum of the absolute values of the motion vectors. In this example, the absolute motion measure is 14. A second motion measure is the sum of arithmetic (signed) values of the motion vectors to horizontal (X) and vertical (Y) directions. Using the same two motion vectors, the arithmetic horizontal (X) measure is 3 and arithmetic vertical (Y) measure is 7. The arithmetic motion measure is therefore 10. If the absolute motion measure is much greater than the arithmetic motion measure, then the motion vectors are pointing in many different directions. Alternatively, if the absolute motion measure is very close to the absolute (unsigned) value of arithmetic motion measure, then there is highly consistent motion movement in the video sequence (even though the actual video sequence has not been decoded). This motion measure information can be used to determine the motion content within a video sequence. For example, if it is determined that the motion content is highly inconsistent (e.g., when the arithmetic motion measure is much less than the absolute motion measure), then more aggressive transcoding can be applied to the coded pictures of this bitstream because artifacts may be masked out. In addition, if there is a rapid increase in the absolute motion measure or the arithmetic motion measure, then there is an increase in motion content in the video sequence, implying more aggressive transcoding may be applied by the multiplexer on the bitstream with greater amount of motion content.

Alternatively, rather than summing the motion vectors for each macro block within a picture, it may be desirable to add a motion vector to the sum only if it is beyond a given threshold. More particularly, it is easier for a viewer to track small movements than large, quick movements. As a result, it may be necessary to only detect fast, large movements. Once such a fast and/or quick movement is detected, it may be desirable to reduce the bit rate. Thus, the statistical re-multiplexer may independently determine that reduction of bit rate is desirable or, alternatively, the statistical re-multiplexer may be instructed to reduce the bit rate. Similarly, this amount of bit rate reduction may be provided to the statistical re-multiplexer or the amount of bit rate reduction may be determined by the statistical re-multiplexer. The amount of reduction may be a default amount, or the amount may be determined based upon the sum of the motion vectors.

Special effect information such as scene cuts, fades, wipes, etc., are commonly found in a video sequence and are usually used during a transition, or scene change, in the video sequence. In general, human vision tolerates more visual artifacts during these transitions. However, when a video compressor is encoding the video data during a special effect, more bits are typically used for the corresponding coded picture. Within the compressed bitstream, it is generally difficult to obtain information about the special effect without computationally expensive complete decoding and re-encoding. However, in accordance with one embodiment, scene change detection is accomplished from the compressed video data without complete decoding and re-encoding.

Figure 9:
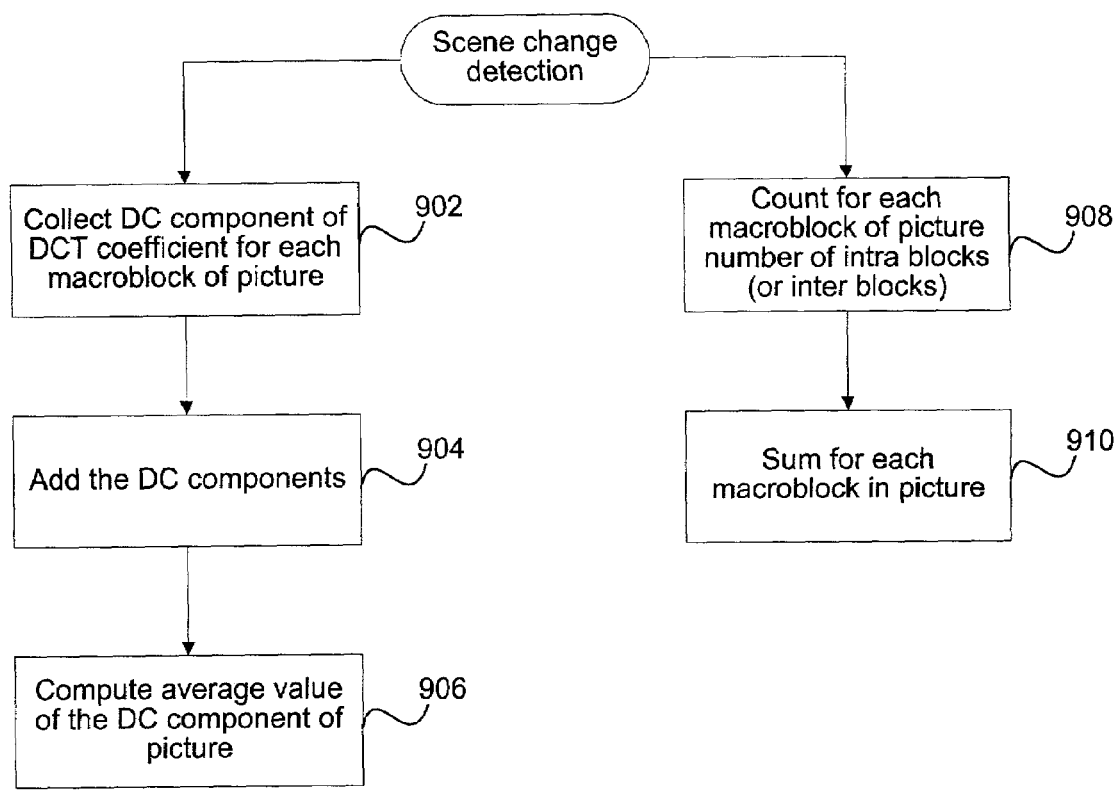
FIG. 9 is a process flow diagram illustrating a method of collecting statistics as shown at block 706 of FIG. 7 to perform scene change detection in accordance with one embodiment of the invention.

FIG. 9 is a process flow diagram illustrating a method of collecting statistics as shown at block 706 of FIG. 7 to perform scene change detection in accordance with several embodiments of the invention. In accordance with one embodiment of the invention, scene change detection is performed through information obtained from the DCT coefficients. As shown at block 902 one or more DC components of DCT coefficients for each macroblock of the picture are collected. For instance, these DC components may indicate a sudden change in lighting. The DC components are then added at block 904. The sum of the DC components is then used to compute an average value of the DC component over the entire picture at block 906. More particularly, this may be accomplished by summing the DC components and dividing them by the number of DC components collected. This average value may therefore represent the average brightness of the picture.

In accordance with another embodiment of the invention, scene change detection is performed through the type of macroblock. More particularly, as shown at block 908 the number of intra blocks for each macroblock of the picture are counted. Alternatively (or in addition), the number of inter blocks in each macroblock of the picture may be counted. The number of intra and/or inter blocks is then summed for each macroblock in the picture to obtain a sum for the entire picture at block 910. As known to those of ordinary skill in the art, intra and inter macroblocks are coded using motion vectors with reference to a neighboring picture. Thus, the motion vectors are used to determine whether each macro block is an intra or inter macroblock. For a frame-prediction picture, an inter macrblock can have either one forward motion vector, one forward-coded macroblock, or both, which will be referred to herein as forward-coded macroblocks, backward-coded macroblocks, or bi-directional macroblocks, respectively. By counting the number of motion vectors in each temporal direction, a measure of correlation can be derived. Scene change can then be determined by examining the correlation measure.

For instance, for a frame-predicted P-picture, it can have either intra macroblocks or forward-coded macroblocks. (Note: a skipped macroblock should be treated as a special case of forward-coded macroblock.) A correlation measure corresponding to a P-picture i, $C_i$, can be defined as follows:

$$C_i = \frac{N_i^F}{N_i^T}$$

where $N_i^F$ is the number of macroblocks containing forward motion vectors and $N_i^T$ is the total number of macroblocks corresponding to a P-picture i.

When a scene change happens between the reference picture (previous I- or P-picture) and the current P-picture, most of the macroblocks will be encoded as intra macroblocks due to extremely low correlation. For a frame-predicted B-picture, it can have either intra macroblocks, forward-coded macroblocks, backward-coded macroblocks, or bi-directional macroblocks. By looking at the number of motion vectors of both past and future reference pictures, one can easily find out the correlation between the current B-picture and its past and future reference pictures. Similar to P-pictures, two correlation measures for a B-picture i, $C_i^P$, related to the past reference picture and $C_i^F$, related to the future reference picture, are defined below:

$$C_i^P = \frac{N_i^F}{N_i^T}$$

$$C_i^F = \frac{N_i^B}{N_i^T}$$

where the meaning of $N_i^F$ and $N_i^T$ are the same as above, and $N_i^B$ is the number of macroblocks containing backward motion vectors. A scene change can be easily detected with the above correlation measures, using either P-pictures or B-pictures. While the operation is a bit more complicated on field-predicated P- and B-picture, similar correlation measures can be derived to detect scene changes.

Once a scene change is detected, the statistical re-multiplexer may use scene cut information, for example, to flexibly adapt multiplexing of multiple bitstreams. More specifically, if the statistical re-multiplexer knows which coded picture is the first picture after the scene cut, the statistical re-multiplexer can adopt a more aggressive transcoding (bit rate reduction) on the coded pictures immediately following the scene cut, including the first picture. As human vision is generally less demanding on the video images immediate after a scene cut, this allows the scheduler to 'steal' bandwidth from the pictures immediately following the scene cuts and use it to improve the picture quality of other channels within the same multiplex.

During a scene change, there may be a fade or dissolve. A fade may be defined as the gradual fade out of a picture to a black or white background. A dissolve may be defined as occurring when one picture slowly appears while another picture slowly dissappears.

The statistical re-multiplexer may also use fade or dissolve information to flexibly adapt multiplexing of a bitstream. More specifically, the bit rate may be reduced in a similar approach to that of the scene cut in stealing bandwidth from the pictures immediately following a fade and use it to improve the picture quality of other channels within the same multiplex. The motivation is similar: during a fade (or dissolve), human vision tends to notice artifacts less. In addition, the transcoding process, if applied, may achieve bit rate reduction on the pictures corresponding to the fades by cutting higher discrete cosine transform (DCT) coefficients (via either DCT coefficient truncation or spatial filtering). Knowing the duration of the fade ahead of time also allows the statistical re-multiplexer to determine the duration of this adjusted bit rate control.

Figure 10:
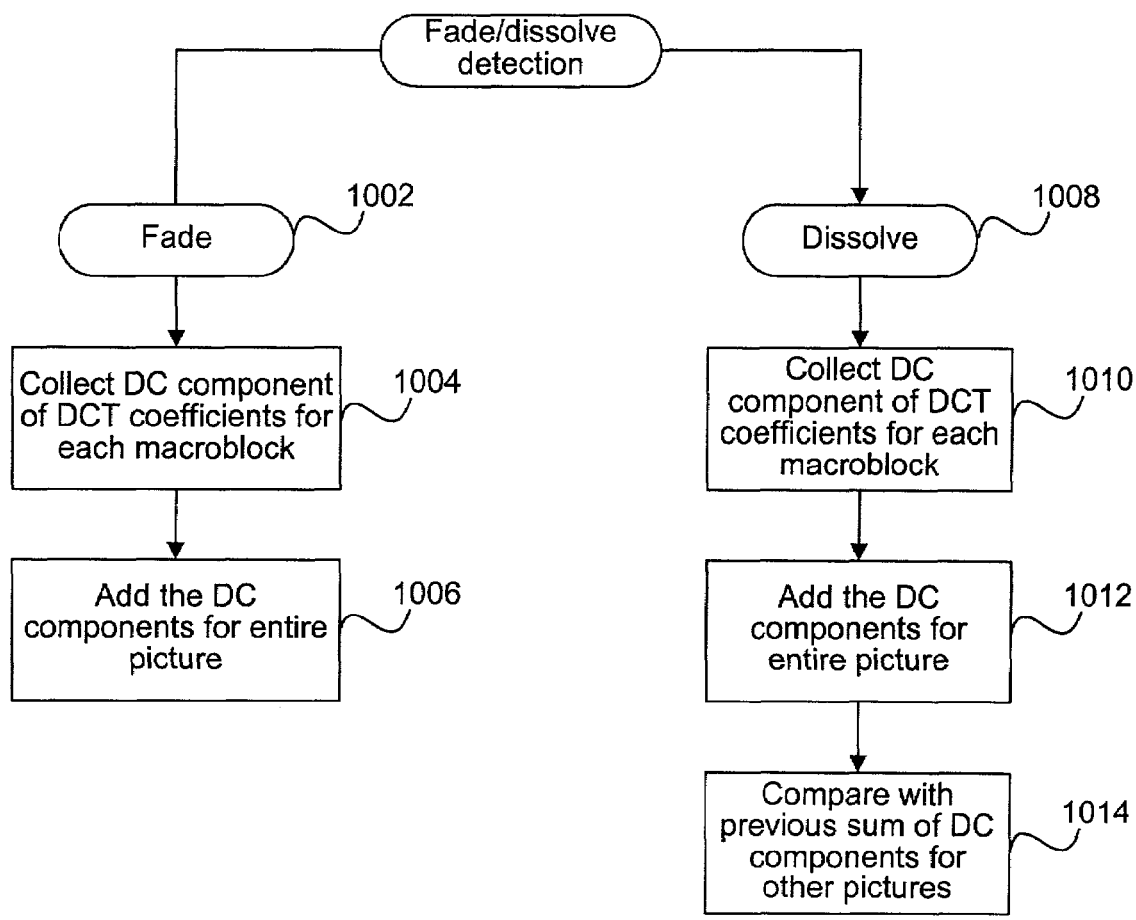
FIG. 10 is a process flow diagram illustrating a method of collecting statistics as shown at block 706 of FIG. 7 to perform fade/dissolve detection in accordance with one embodiment of the invention.

The present invention enables fade/dissolve detection to be performed without complete decoding and re-encoding. FIG. 10 is a process flow diagram illustrating a method of collecting statistics as shown at block 706 of FIG. 7 to perform fade/dissolve detection in accordance with one embodiment of the invention. As shown at block 1002, fade detection may be performed through collection of one or more DC components of DCT coefficients for each macroblock of a picture at block 1004. The DC components are then summed at block 1006. If the sum is a low value, this may indicate a fade in or fade out.

Similarly, dissolve detection may also be performed with respect to previous pictures as shown at block 1008. More particularly, the DC components of DCT coefficients for each macroblock of the picture are collected at block 1010 and summed at block 1012. The sum of the DC components may then be compared with the sum of DC components for other pictures at block 1014. For instance, the sum may be compared with immediately preceding pictures to determine whether the sums are substantially different. If one sum is much greater than the other, this may indicate that a dissolve has occurred.

Figure 11:
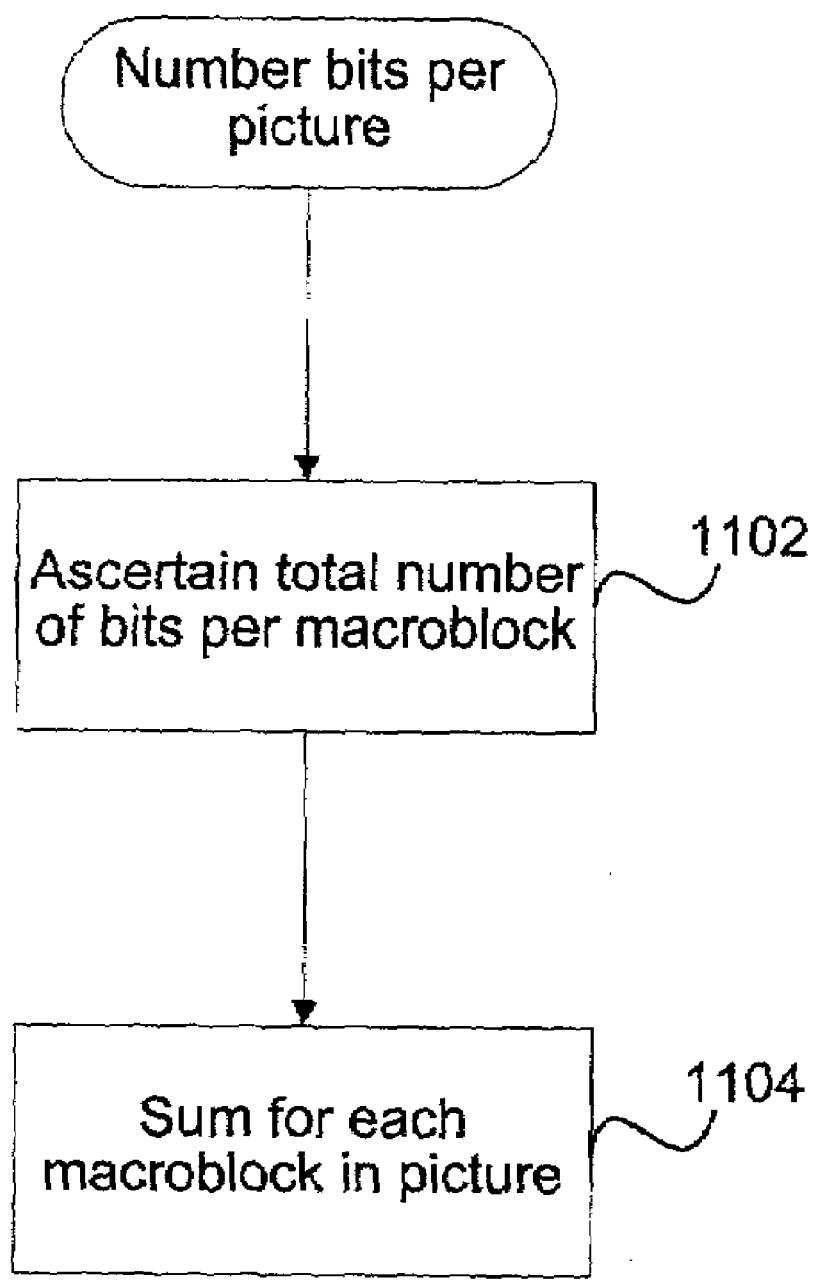
FIG. 11 is a process flow diagram illustrating a method of collecting statistics as shown at block 706 of FIG. 7 to ascertain a total number of bits per picture in accordance with one embodiment of the invention.

FIG. 11 is a process flow diagram illustrating a method of collecting statistics as shown at block 706 of FIG. 7 to ascertain a total number of bits per picture in accordance with one embodiment of the invention. For instance, the total number of bits may be the number of DCT coefficient bits. As shown, the total number of bits in each macroblock is ascertained at block 1102. The number of bits is then summed for each macroblock in the picture at block 1104.

Figure 12:
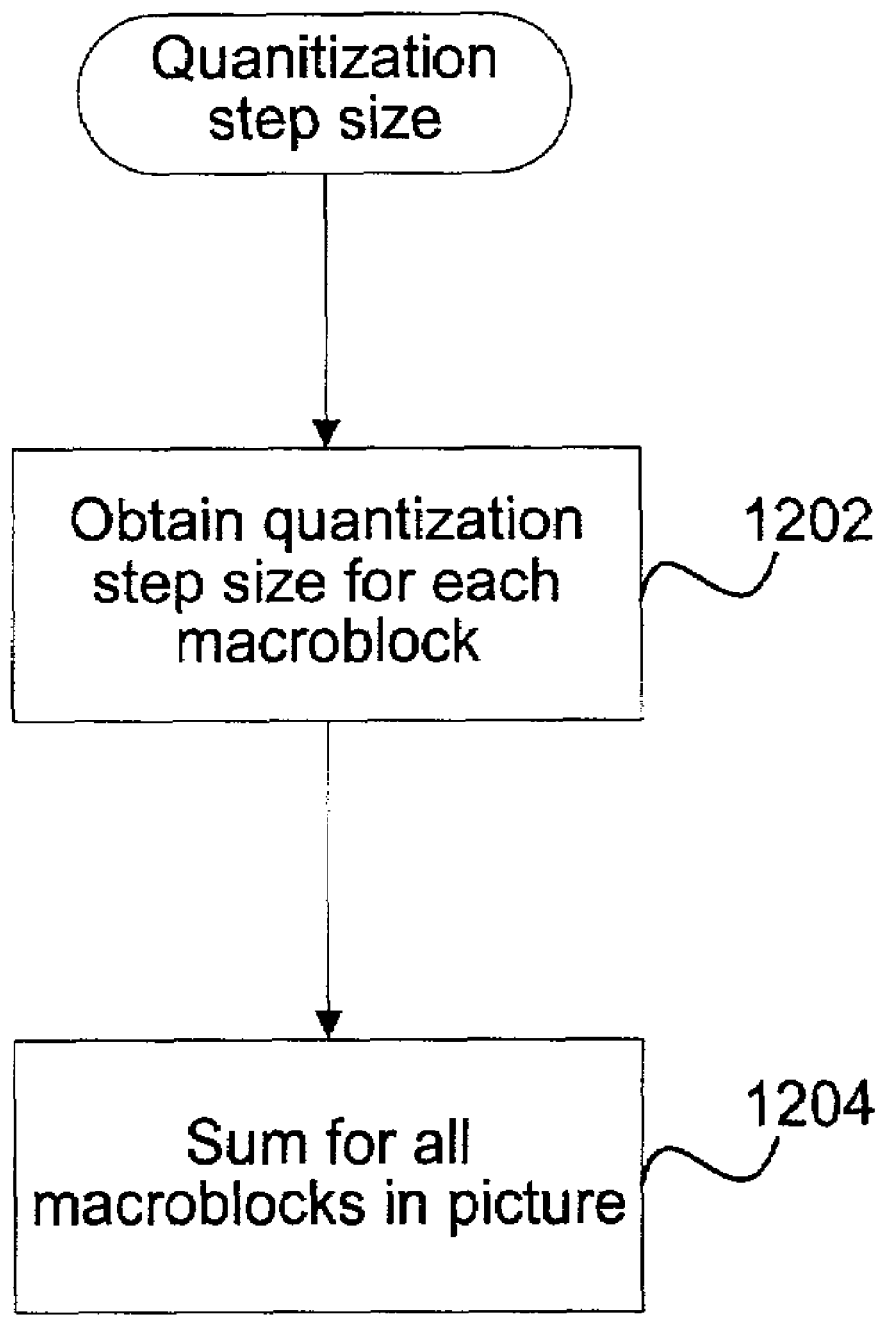
FIG. 12 is a process flow diagram illustrating a method of collecting statistics as shown at block 706 of FIG. 7 to ascertain a quantization step size sum in accordance with one embodiment of the invention.

FIG. 12 is a process flow diagram illustrating a method of collecting statistics as shown at block 706 of FIG. 7 to ascertain a quantization step size sum in accordance with one embodiment of the invention. As shown at block 1202, the quantization step size is obtained for each macroblock. The obtained quantization step sizes are then summed for the entire picture at block 1204. A smaller step size requires more bits to represent the same information as that represented by a larger step size. Thus, a larger sum indicates that the picture is less detailed than a smaller sum. This may indicate, therefore, that when the detail is less that the bit rate may be increased by the statistical re-multiplexer. Similarly, when the detail is greater, it may be desirable to reduce the bit rate.

Figure 13:
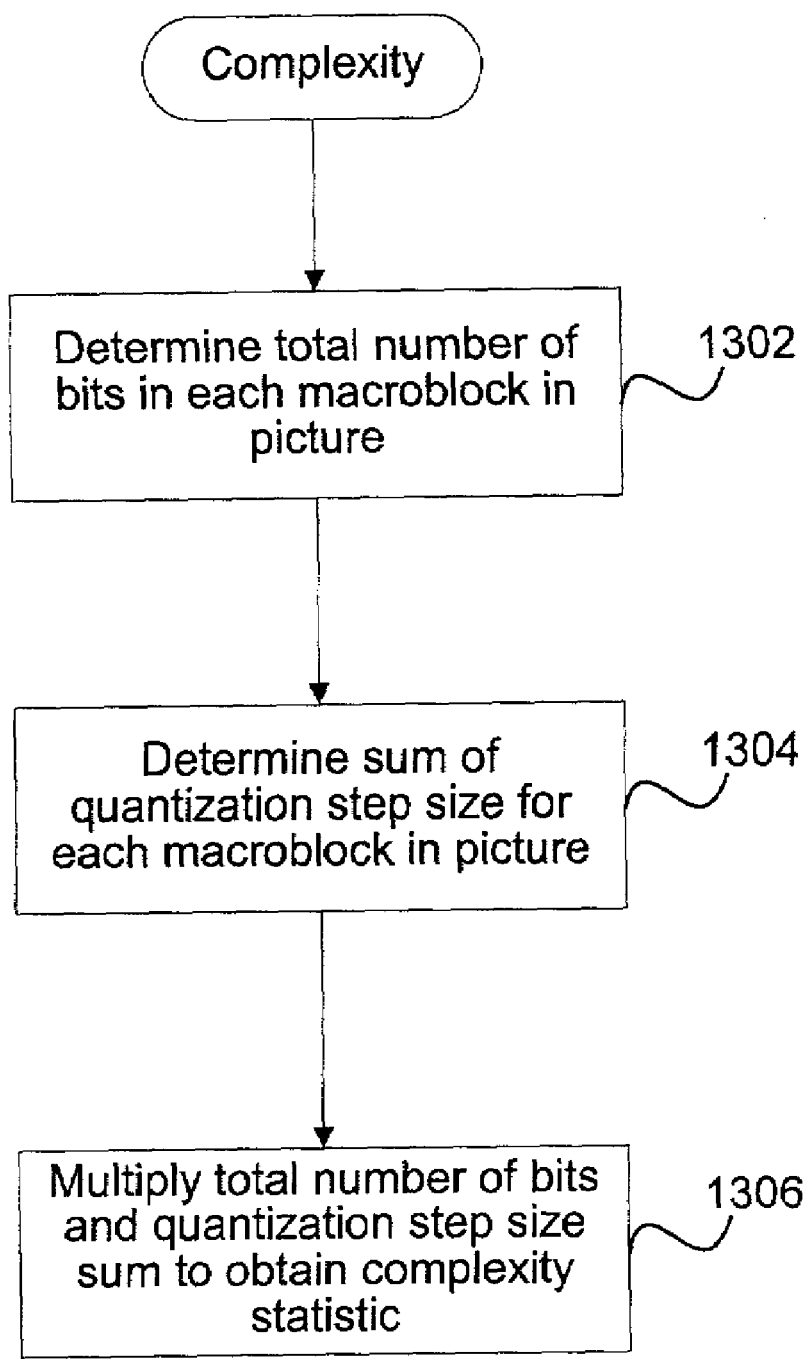
FIG. 13 is a process flow diagram illustrating a method of collecting statistics as shown at block 706 of FIG. 7 to ascertain a picture complexity in accordance with one embodiment of the invention.

Picture complexity may be ascertained from the total number of bits obtained in FIG. 11 and the quantization step size sum obtained in FIG. 12. FIG. 13 is a process flow diagram illustrating a method of collecting statistics as shown at block 706 of FIG. 7 to ascertain a picture complexity in accordance with one embodiment of the invention. As shown at block 1302, the total number of bits in a picture is ascertained as described above with reference to FIG. 11. In addition, the sum of the quantization step size for each macroblock in the picture is obtained at block 1304 as described above with reference to FIG. 12. The total number of bits and the quantization step size sum are then multiplied at block 1306 to obtain a complexity statistic. In other words, the complexity measure can be the sum of the product of the quantization scale value for each macroblock and the number of bits used to encode the macroblock over the entire picture. Accordingly, the statistical re-multiplexer may modify the bit rate such that the bit rate is less for a picture of greater complexity (or greater for a picture that is less complex).

Figure 14:
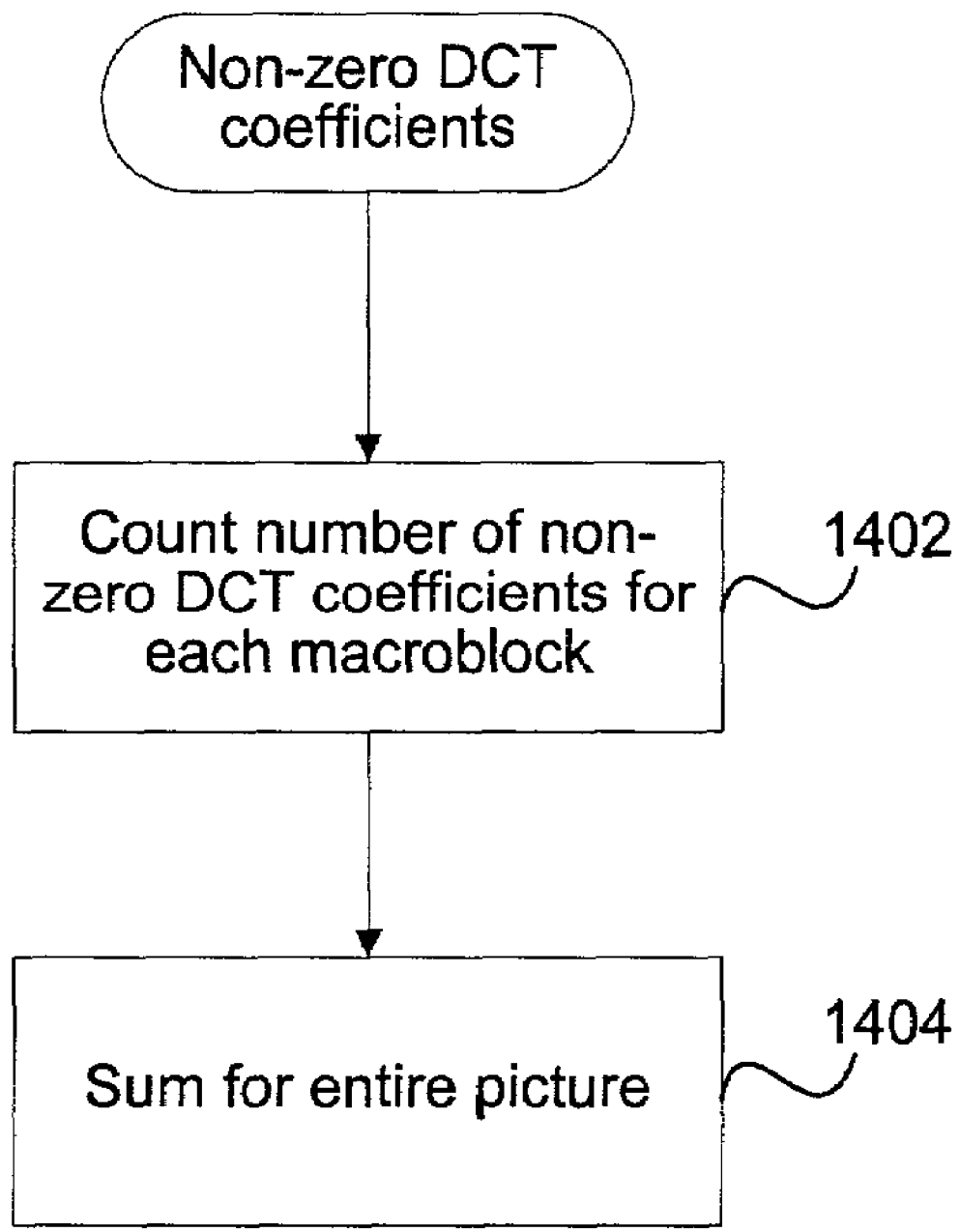
FIG. 14 is a process flow diagram illustrating a method of collecting statistics as shown at block 706 of FIG. 7 to ascertain a total number of non-zero DCT coefficients in accordance with one embodiment of the invention.

DCT coefficients may be used to indicate the amount of detail in a coded picture. FIG. 14 is a process flow diagram illustrating a method of collecting statistics as shown at block 706 of FIG. 7 to ascertain a total number of non-zero DCT coefficients in accordance with one embodiment of the invention. As shown at block 1402 the number of non-zero DCT coefficients for each macroblock is counted. The number of non-zero DCT coefficients is then summed for the entire picture at block 1404. A higher sum indicates greater detail in the picture, while a lower sum indicates less detail in the picture. The statistical re-multiplexer may therefore use this information to determine when bit rate reduction (e.g., recoding) is appropriate. For instance, the bit rate may be reduced when there is greater detail in the picture (e.g., when the sum is greater than a predefined threshold value) and may be increased or left the same when there is less detail in the picture (e.g., when the sum is less than a predefined threshold value). In addition, this information may be applied to speed up a DCT or inverse DCT operation.

Figure 15:
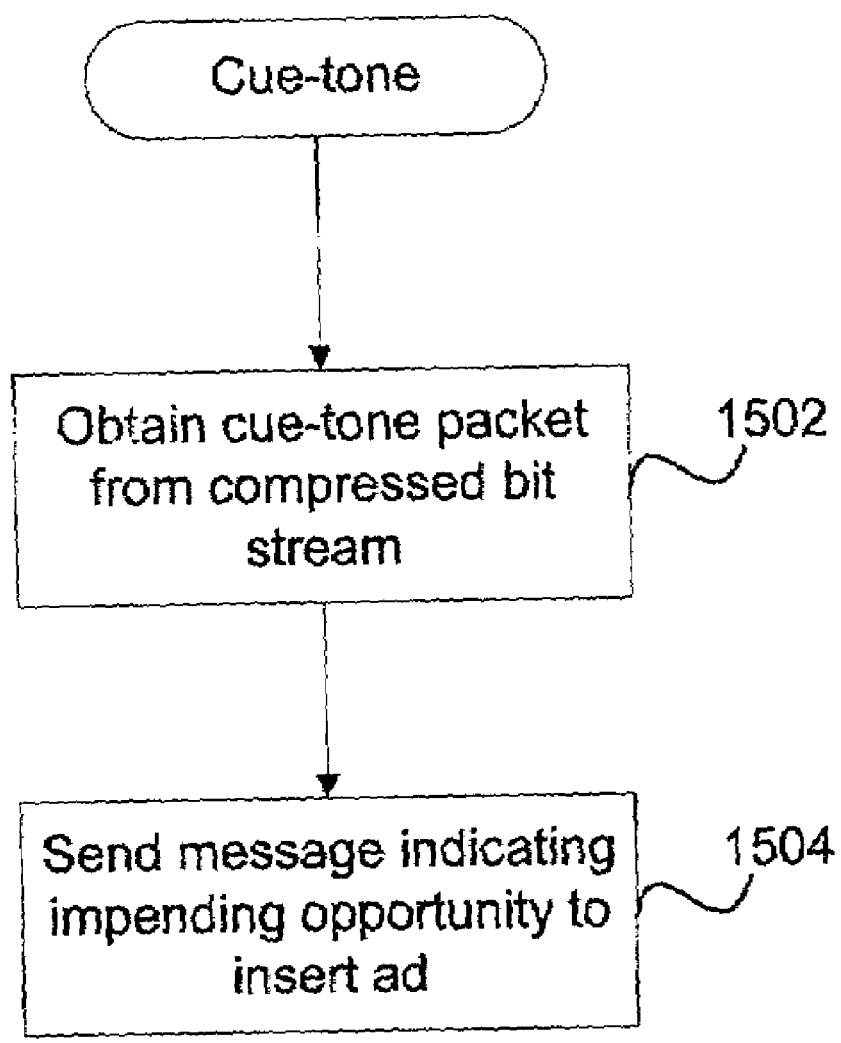
FIG. 15 is a process flow diagram illustrating a method of collecting statistics as shown at block 706 of FIG. 7 to perform cue-tone detection in accordance with one embodiment of the invention.

A cue-tone is often used to indicate when an advertisement is being transmitted. FIG. 15 is a process flow diagram illustrating a method of collecting statistics as shown at block 706 of FIG. 7 to perform cue-tone detection in accordance with one embodiment of the invention. A cue-tone packet is obtained from the compressed bit stream at block 1502. For instance, the cue-tone packet may indicate that an advertisement is being transmitted in 3 seconds. A message indicating an impending opportunity to insert an advertisement is then sent to the statistical re-multiplexer at block 1504.

Figure 16:
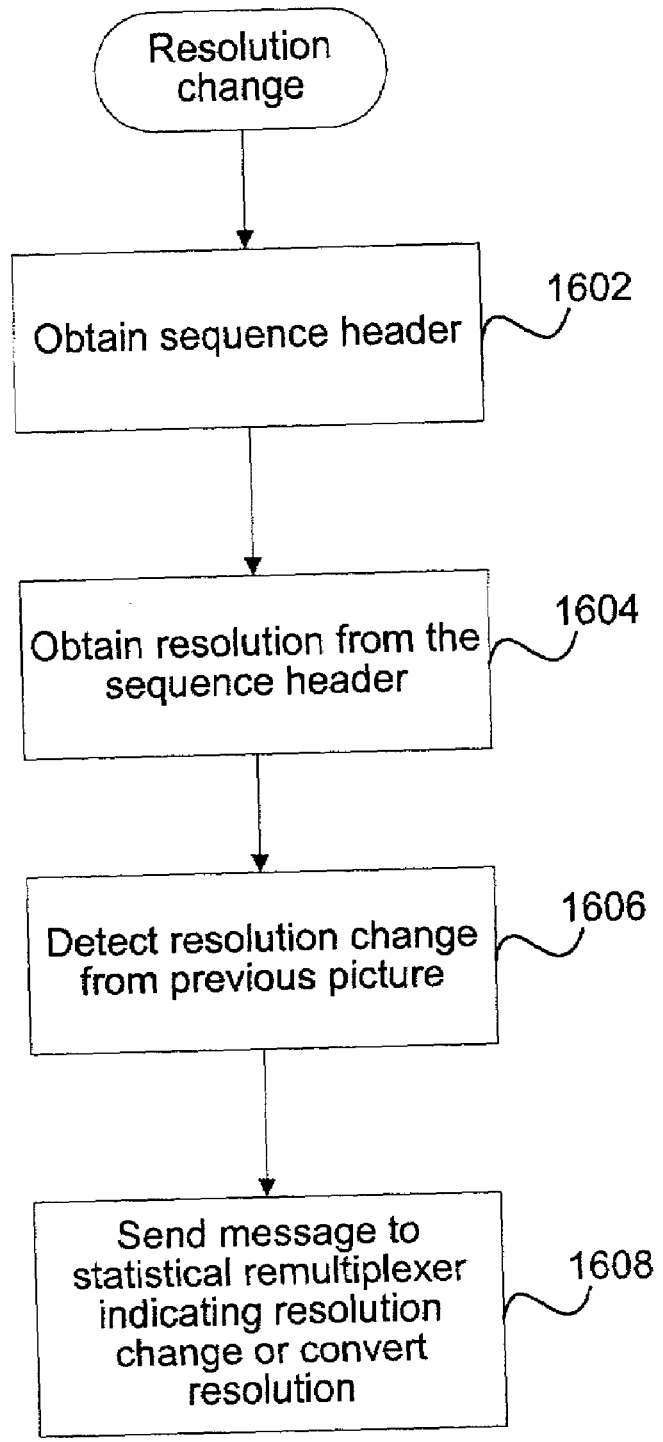
FIG. 16 is a process flow diagram illustrating a method of collecting statistics as shown at block 706 of FIG. 7 to detect resolution change in accordance with one embodiment of the invention.

Each image has a resolution defined by a number of lines per picture as well as a number of pixels per line. A change in resolution of the picture may also be determined from the compressed video data. Since the change of resolution may require a different amount of memory and/or processing by the statistical re-multiplexer, it is desirable to enable the change of resolution to be detected. FIG. 16 is a process flow diagram illustrating a method of collecting statistics as shown at block 706 of FIG. 7 to detect resolution change in accordance with one embodiment of the invention. At block 1602 a sequence header of the picture is obtained from the compressed video data. The resolution of the picture is obtained from the sequence header at block 1604. A resolution change may then be detected comparison to the resolution for the previous picture at block 1606. A message may then be sent to the statistical re-multiplexer at block 1608 indicating a resolution change or that a change in resolution is appropriate. The statistical re-multiplexer may therefore be aware of the changing requirements on its RAM as well as its frame buffer used for decoding.

Other compression statistics include determining whether there has been a significant bit rate change. For instance, a sum of the bits in each picture may be retained and compared for each subsequent picture. In this manner, a substantial bit rate change from previous pictures may be detected and an appropriate message may be sent to the statistical re-multiplexer so that it can modify its processing accordingly. It is important to note that in determining resolution change, the current and previous picture are preferably of the same coding type (e.g., I, P, B).

In addition, the coded picture type (e.g., P, B, I) may be obtained from the picture header. The picture type or an appropriate message may then be sent to the statistical re-multiplexer. This is useful since an I type picture includes more bits than a P or B picture, and therefore may require further processing (or reduction of bit rate) by the statistical re-multiplexer.

An exemplary manner in which compression statistics may be used to change the bit rate in a statistical re-multiplexer is application of a complexity measure, such as that described above with reference to FIG. 13. Various embodiments of a complexity measure may be implemented. For instance, the complexity measure $C^I_n$ of frame n in program i may alternatively be expressed as follows:

$$C^I_n = W^I \cdot BCoef^I_n \cdot Q^i_n$$

where $BCoef_n^I$ is the number of DCT coefficient bits used to encode the frame n of program I, $Q_n^I$ is the average quantization step size chosen for the frame n of program i, and $W^i$ is the weighting factor for the program i. The weighting factor may be a weighting factor used under normal operation. In order to maintain constant picture quality, each picture type (e.g., I, P, and B) may be scaled differently, and therefore the complexity measure may be multiplied by an appropriate scale factor (e.g., Xi, Xp, Xb). This complexity measure may be used to determine the complexity for a given macroblock. The complexity measure may then be summed over all macroblocks for a given video frame. This complexity measure can be used for two purposes. First, under constant bit rate operation, the complexity measure may be used to estimate the average quantization step size needed for any given bit-budget. While the target number of bits used for the video frame is known, the target quantization step size can be estimated from the complexity/bits, where the number of bits is derived from the constant bit rate. Second, under variable bit rate operation, it can be used to predict bits needed to encode a certain video frame to maintain a certain video quality. The target quality (target quantization step size) is known, while the estimated bits used for the desired quality is Complexity/quantization step size.

Figure 17:
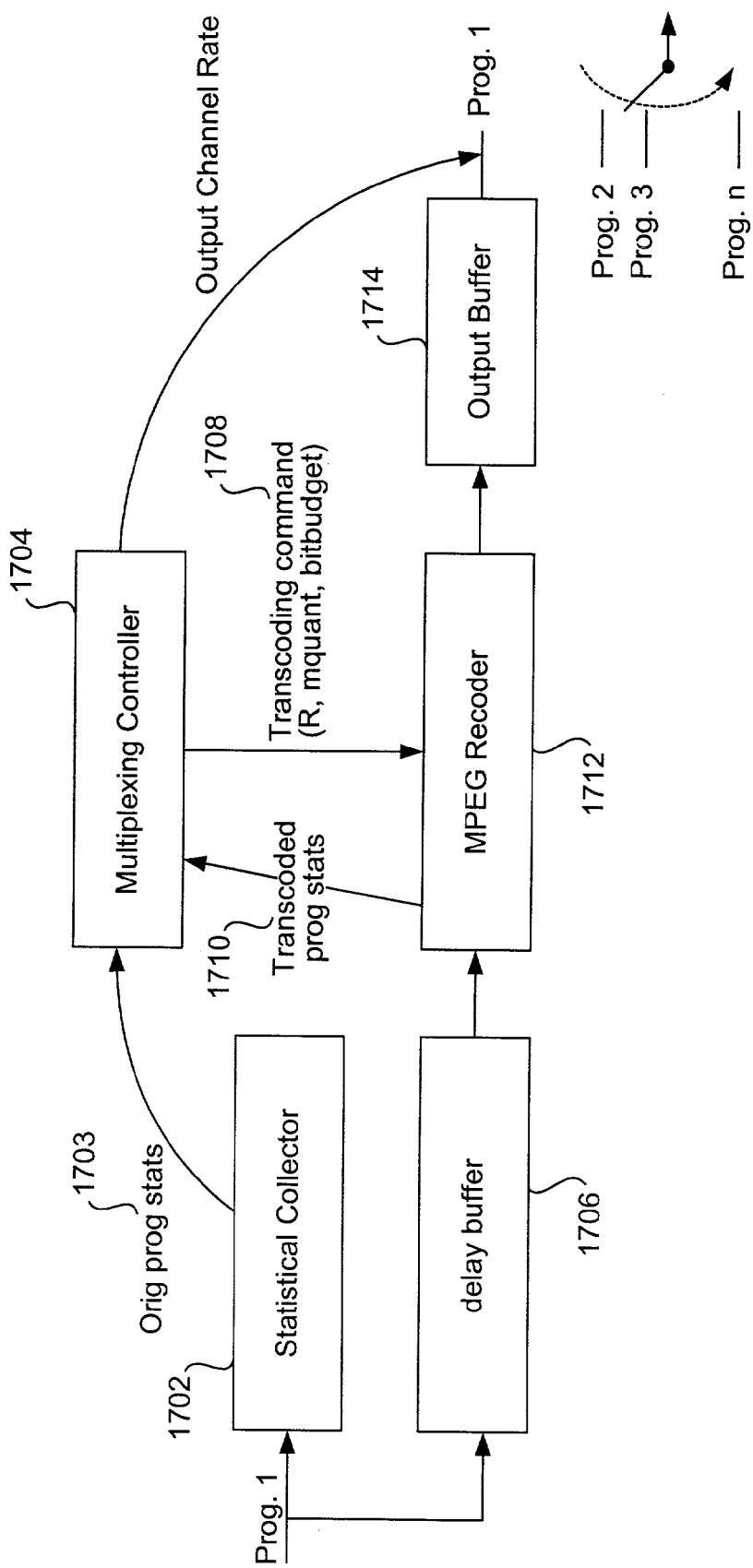
FIG. 17 is a block diagram illustrating a system in which embodiments of the present invention may be implemented.

FIG. 17 is a block diagram illustrating a system in which embodiments of the present invention may be implemented. More particularly, compression statistics such as the complexity measure may be used to statistically multiplex any given video frame. As shown in FIG. 17, when a bitstream of program 1 is received, a statistical collector 1702 extracts compression statistics 1703 and sends the compression statistics to a multiplexing controller 1704. The compressed bitstream is also sent to a delay buffer 1706. After a fixed amount of delay, the multiplexing controller 1704 determines a transcoding command 1708 based on the compression statistics obtained from the statistical collector 1702 and may also be based on transcoded program statistics 1710 obtained from a MPEG recoder 1712. For instance, the command 1708 can be in the form of an allocated channel bitrate, a bit-budget for the current picture, or average quantization step size. The output from the statistical remultiplexer may then be provided to an output buffer 1714.

In order to make the allocated output bit rate for each transcoder independent of frame type, the complexity of each program is preferably averaged over different frame types:

$$\overline{C}_n^j = \frac{N_I \cdot \hat{CI}_n^i + N_P \cdot \hat{CP}_n^i + N_B \cdot \hat{CB}_n^i}{N}$$

where N is the number of frames per group of pictures (GOP), $N_I$, is the number of I-frames per GOP, $N_P$ is the number of P-frames per GOP, and $N_B$ is the number of B-frames per GOP. $CI_n$ is the scaled complexity of the most recent I-frame, $CP_n$ is the scaled complexity of the most recent P-frame, and $CB_n$ is the scaled complexity of the most recent B-frame.

Statistical multiplexing may performed using information and/or compression statistics obtained from the compressed video data. More particularly, assuming the transcoder of the statistical remultiplexer has its own variable bit rate control, the statistical remultiplexer allocates bitrate to each program (i.e., participant) according to its compression statistic(s) (e.g., complexity measure).

Suppose that there are N programs in the statistical remultiplexer pool and the pool bandwidth is $R_p$ bits/frame. First, the statistical remultiplexer obtains a required bandwidth from all video channels. More particularly, the required bandwidth includes all coded bits (not just DCT coefficient bits). In addition, the required bandwidth also preferably includes a number of bits used to adjust the variable bit rate buffer fullness. The required bandwidth may be used to prevent underflow of the buffer of the decoder. The aggregate required bandwidth for any statistical multiplexer pool is as follows:

$$R_{REQn}^T = \sum_{i=0}^{N} Rreq_n^i$$

where $Rreq_n^i$ is the required bandwidth reported from video channel i at frame n. For frame n, the bitrate allocated to program i with an average complexity measure $\overline{C}_n^i$ is given in the following equation:

$$R_n^i = \sum_{j=0}^{} \frac{\overline{C}_n^i}{\overline{C}_n^j} \cdot (R_{Pn} - R_{REQn}^T) + Rreq_n^i$$

The multiplexing controller can then send the computed channel bandwidth (bit rate) and the appropriate portion of the bitstream to the MPEG recoder. The bandwidth may be in bandwidth per GOP, bandwidth per picture, bandwidth per field, or per slice. A simple approach is to reduce bits evenly across all macroblocks. Thus, the multiplexing controller may send the total bits in accordance with the computed bit rate to the MPEG recoder. Alternatively, the multiplexing controller may send a number of bits-to-be-reduced to the recoder. The recoder may then estimate from the number of bits-to-be-reduced the number of bits to be reduced per macroblock. This number of bits to be reduced per macroblock may then be converted to a new quantization step size for the recoding process. After recoding, the difference between the bits to be reduced and true reduced bits may be provided as feedback to provide the next quantization step size.

The bit rate R obtained above should also be scaled to corresponding frame types. Thus, the statistical controller may convert the bit rate R calculated above as follows:

$$BB_n^i = \frac{\hat{C}_n^i}{N_I \cdot \hat{CI}_n^i + N_P \cdot \hat{CP}_n^i + N_B \cdot \hat{CB}_n^i} \cdot (R_n^i - Rreq_n^i)$$

In this example, the bit budget BB is for DCT coefficients only. Other bits are included as part of Rreq. For example, when the statistical multiplexer performs buffer monitoring, it would adjust the buffer level occasionally. This can be achieved by adding or deducting bits to or from Rreq above. Adjustment to the bandwidth (bit rate) may also be based on other pre-parsed video statistics defined above.

The previous example relates to application of a complexity measure to statistical remultiplexing. However, other statistical measures obtained from compressed video data may also be applied to statistical remultiplexing. Thus, the above example is merely illustrative.

The present invention enables information and statistics to be obtained from pre-compressed digital video signals. This compression information and statistics may then be used to better control the statistical remultiplexing process. In this manner, compression statistics that would otherwise be difficult to obtain may be pre-extracted and used to achieve a higher coding efficiency in statistical remultiplexing. More particularly, through the information and statistics obtained from the compressed digital video data, it is possible to determine the number of bits required to transcode the bitstream to a lower bit rate using a different but related parameter set. Moreover, such methods may also achieve better video quality. The above-described compression statistics may be used separately or in combination with one another.

The present invention is suitable for use with the MPEG-1 specification, described in ISO/IEC International Standard 11172; "Coding of moving pictures and associated audio for digital storage media up to about 1.5 Mbits/s", November 1993, which is herein incorporated by reference. The present invention is also suitable for use with the MPEG-2 specification, described in ISO/IEC International Standard 13818 "Generic coding of moving pictures and associated audio information", November 1994, which is herein incorporated by reference. The present invention is also suitable for use with the MPEG-4 specification, described in ISO/IEC International Standard 14496; "Coding of moving pictures and associated audio information", March 2000, which is herein incorporated by reference.

In the above-described embodiments, the multiplexer used is a statistical re-multiplexer. Statistical re-multiplexing, in general, is a technique that simultaneously encodes and combines multiple channels of video signals into a single bitstream for transmission. The main difference between statistical multiplexing and statistical re-multiplexing is that the inputs to the statistical re-multiplexer are pre-compressed bitstreams. It should be noted that, while the discussion herein primarily refers to application to a statistical re-multiplexer, any of the techniques described herein are also suitable for use with pre-compressed bitstreams and re-multiplexing and discussion of multiplexing is intended to be inclusive of any form of multiplexing such as re-multiplexing of compressed bitstreams.

In the above described embodiments, the network devices generate the compression statistics in real-time. Compression statistic generation according to present invention may also be done in non-real-time or off-line on pre-stored compressed bitstreams using general-purpose computers such as PCs or general-purpose workstations. In many applications, particularly in WebServer based IP streaming, a transmission bitstream is created and stored on a large capacity WebServer. In this case, the bitstream is encoded and stored before streaming. Thus, the present invention may be performed in non real-time and by general-purpose computers.

The structure of the MPEG standard is well known to one of skill in the art and described by the MPEG standards. The present invention is suitable for use with the MPEG-1 specification, described in ISO/IEC International Standard 11172; "Coding of moving pictures and associated audio for digital storage media up to about 1.5 Mbits/s", November 1993, which is herein incorporated by reference. The present invention is also suitable for use with the MPEG-2 specification, described in ISO/IEC International Standard 13818; "Generic coding of moving pictures and associated audio information", November 1994, which is herein incorporated by reference. The present invention is also suitable for use with the MPEG-4 specification, described in ISO/IEC International Standard; "Coding of moving pictures and associated audio information", March 2000, which is herein incorporated by reference.

The methods of this present invention may be implemented on various systems. For example, the invention may be implemented on network devices such routers and/or switches. In a specific embodiment, the systems of this invention may be specially configured routers such as, for example, specially configured router models 1600, 2500, 2600, 3600, 4500, 4700, 7200, and 7500 available from Cisco Systems, Inc. of San Jose, Calif. In another specific embodiment, the systems of this invention may be specially configured CMTSs such as, for example, specially configured models in the uBR-7200 series of CMTSs available from Cisco Systems. A general architecture for some of these machines will be given below. In an alternative embodiment, the methods of this invention may be implemented on a video streaming server, a cache server, a web server, or a general-purpose network host machine such as a personal computer or workstation. Further, the invention may be at least partially implemented on a card (e.g., an interface card) for a network device or a general-purpose computing device.

Referring now to FIG. 18, a high level block diagram of an exemplary general purpose router 1810 suitable for implementing the present invention includes a master central processing unit (CPU) 1862, interfaces 1868, and a bus 1815 (e.g., a PCI bus). When acting under the control of appropriate software or firmware, the CPU 1862 is responsible for such router tasks as routing table computations and network management. It preferably accomplishes all these functions under the control of software including an operating system (e.g., the Internetwork Operating System (IOS®) of Cisco Systems, Inc.) and any appropriate applications software. CPU 1862 may include one or more processors 1863 such as a processor from the Motorola family of microprocessors or the MIPS family of microprocessors. In an alternative embodiment, processor 1863 is specially designed hardware for controlling the operations of router 1810. In a preferred embodiment, a memory 1861 (such as non-volatile RAM and/or ROM) also forms part of CPU 1862. However, there are many different ways in which memory could be coupled to the system.

The interfaces 1868 are typically provided as interface cards (sometimes referred to as "line cards"). Generally, they control the sending and receiving of data packets over the network and sometimes support other peripherals used with the router 1810. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1862 to efficiently perform routing computations, network diagnostics, security functions, etc.

In one embodiment, the present invention may be implemented in a network device such as a video embedding line card. The line card behaves as video network device without any physical interface. In some cases, it may include an appropriate interface for digital video such as ASI and DHEI. The line card may also include multiple on-board video processors for format conversion. While the video processors perform the typical IP routing functions and decide the network loading, these video processors may also change the format and/or bit rate for each video channel and input compressed bitstream dynamically, based on the network loading statistics. In another embodiment, a video processing line card includes a physical interface to twisted pair for xDSL output or a physical interface to coaxial cable for QAM or QPSK output. QAM/QPSK format may be converted into satellite or wireless signal, one-way or two-way.

Although the system shown in FIG. 18 is one specific router of the present invention, it is by no means the only router architecture on which the present invention can be implemented. For example, an architecture having a single processor that handles communications as well as routing computations, etc. would also be acceptable. Further, other types of interfaces and media could also be used with the router.

Regardless of network device's configuration (for cable plants or otherwise), it may employ one or more memories or memory modules (e.g., memory 1861) configured to store program instructions for the network operations and other functions of the present invention described herein. The program instructions may specify an operating system and one or more applications, for example. Such memory or memories may also be configured to store data streams, data structures or other specific non-program information described herein.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

The present invention is suitable for use on any transmission channel. One particular communication channel that is becoming increasingly common is the cable modem channel, such as that defined by the DOCSIS cable modem standard by CableLabs and the DAVIC cable modem standard by DVB. In DOCSIS based cable data networks, operators and digital service providers use the radio frequency spectrum in the coaxial cable network to deliver digital data signal in a 6 MHz frequency slot. The aggregate data bit rate capacity of the slot may be shared by multiple, possibly different, types of information services. Cable modem service is one such information service that allows service operators to provide a number of two-way interactive digital services to subscribers. One particular digital service delivers a compressed digital video signal for video streaming or video on demand.

Another particular communication channel that is becoming increasingly common is IP networks and Asynchronous Transfer Mode (ATM) networks. Both networks are based on different transport protocols which can be used to transport data or multimedia bitstreams with a pre-specified quality of service. For example, ATM protocol specifies how data is first packetized into fixed sized data units, called cells. It also specifies how such a cell stream can be multiplexed, de-multiplexed, switched and routed between different locations to support end-to-end connections at given bit rate and/or quality of service (QOS).

In another communication channel example, integrated services (IntServ), differential services (DiffServ), and Multiple Protocol Label Switch (MPLS) are used to establish a QOS for different network traffic. These services may use the Common Open Policy Service (COPS) for admission control. Internet Group Management Protocol (IGMP) and a variety of multicast routing protocols are also used to establish and tear down service on a multicast tree, which is commonly used for video transmission. In all these cases, the requested connection must provide the available bandwidth for the data being sent or the requested connection may either have to be rejected or a new set of admissible connection parameters may have to be negotiated.

While this invention has been described in terms of several preferred embodiments, there are alterations, permutations, and equivalents which fall within the scope of this invention which have been omitted for brevity's sake. It is therefore intended that the scope of the invention should be determined with reference to the appended claims.

What is claimed is:

1. A method of applying information obtained from compressed video data to statistical remultiplexing, comprising:
   receiving a compressed bitstream including compressed video data;
   parsing the compressed video data;
   generating one or more compression statistics from the parsed compressed video data; and
   providing information associated with the compression statistics to a statistical remultiplexer;
   wherein generating one or more compression statistics from the parsed compressed video data comprises:
      counting a number of motion vectors in the parsed compressed video data for a plurality of macroblocks in a picture; and
      generating one or more correlation measures corresponding to the picture based on the number of motion vectors in the picture;
   wherein generating one or more compression statistics from the parsed compressed video data further comprises:
      counting a number of motion vectors in a forward direction with respect to the picture;
      wherein generating one or more correlation measures is based on the number of motion vectors in the picture and the number of motion vectors in the forward direction with respect to the picture.

2. The method as recited in claim 1, wherein generating one or more compression statistics from the parsed compressed video data further comprises:
   counting a number of motion vectors in a backward direction with respect to the picture;
   wherein generating one or more correlation measures is based on the number of motion vectors in the picture, the number of motion vectors in the forward direction with respect to the picture, and the number of motion vectors in the backward direction with respect to the picture.

3. A method of applying information obtained from compressed video data to statistical remultiplexing, comprising:
   receiving a compressed bitstream including compressed video data;
   parsing the compressed video data;
   generating one or more compression statistics from the parsed compressed video data; and
   providing information associated with the compression statistics to a statistical remultiplexer;
   wherein generating one or more compression statistics from the parsed compressed video data comprises:
      counting a number of motion vectors in the parsed compressed video data for a plurality of macroblocks in a picture; and
      generating one or more correlation measures corresponding to the picture based on the number of motion vectors in the picture;
   wherein generating one or more compression statistics from the parsed compressed video data further comprises:
   counting a number of motion vectors in a backward direction with respect to the picture;
   wherein generating one or more correlation measures is based on the number of motion vectors in the picture and the number of motion vectors in the backward direction with respect to the picture.

4. An apparatus for applying information obtained from compressed video data to statistical remultiplexing, comprising:
   means for receiving a compressed bitstream including compressed video data;

means for parsing the compressed video data;
means for generating one or more compression statistics from the parsed compressed video data; and
means for providing information associated with the compression statistics to a statistical remultiplexer;
wherein the means for generating one or more compression statistics from the parsed compressed video data comprises:
   means for counting a number of motion vectors in the parsed compressed video data for a plurality of macroblocks in a picture; and
   means for generating one or more correlation measures corresponding to the picture based on the number of motion vectors in the picture;
wherein the means for generating one or more compression statistics from the parsed compressed video data further comprises:
   means for counting a number of motion vectors in a forward direction with respect to the picture;
wherein the means for generating one or more correlation measures is based on the number of motion vectors in the picture and the number of motion vectors in the forward direction with respect to the picture.

5. The apparatus as recited in claim 4, wherein the means for generating one or more compression statistics from the parsed compressed video data further comprises:
   means for counting a number of motion vectors in a backward direction with respect to the picture;
   wherein the means for generating one or more correlation measures is based on the number of motion vectors in the picture, the number of motion vectors in the forward direction with respect to the picture, and the number of motion vectors in the backward direction with respect to the picture.

6. An apparatus for applying information obtained from compressed video data to statistical remultiplexing, comprising:
   means for receiving a compressed bitstream including compressed video data;
   means for parsing the compressed video data;
   means for generating one or more compression statistics from the parsed compressed video data; and
   means for providing information associated with the compression statistics to a statistical remultiplexer;
   wherein the means for generating one or more compression statistics from the parsed compressed video data comprises:
      means for counting a number of motion vectors in the parsed compressed video data for a plurality of macroblocks in a picture; and
      means for generating one or more correlation measures corresponding to the picture based on the number of motion vectors in the picture;
   wherein the means for generating one or more compression statistics from the parsed compressed video data further comprises:
   means for counting a number of motion vectors in a backward direction with respect to the picture;
   wherein the means for generating one or more correlation measures is based on the number of motion vectors in the picture and the number of motion vectors in the backward direction with respect to the picture.

7. An apparatus for applying information obtained from compressed video data to statistical remultiplexing, comprising:
   a processor; and
   a memory, at least one of the processor and the memory being adapted for:
      receiving a compressed bitstream including compressed video data;
      parsing the compressed video data;
      generating one or more compression statistics from the parsed compressed video data; and
      providing information associated with the compression statistics to a statistical remultiplexer;
      wherein generating one or more compression statistics from the parsed compressed video data comprises:
         counting a number of motion vectors in the parsed compressed video data for a plurality of macroblocks in a picture; and
         generating one or more correlation measures corresponding to the picture based on the number of motion vectors in the picture;
      wherein generating one or more compression statistics from the parsed compressed video data further comprises:
         counting a number of motion vectors in a forward direction with respect to the picture;
         wherein generating one or more correlation measures is based on the number of motion vectors in the picture and the number of motion vectors in the forward direction with respect to the picture.

8. The apparatus as recited in claim 7, wherein generating one or more compression statistics from the parsed compressed video data further comprises:
   counting a number of motion vectors in a backward direction with respect to the picture;
   wherein generating one or more correlation measures is based on the number of motion vectors in the picture, the number of motion vectors in the forward direction with respect to the picture, and the number of motion vectors in the backward direction with respect to the picture.

9. An apparatus for applying information obtained from compressed video data to statistical remultiplexing, comprising:
   a processor; and
   a memory, at least one of the processor and the memory being adapted for:
   receiving a compressed bitstream including compressed video data;
   parsing the compressed video data;
   generating one or more compression statistics from the parsed compressed video data; and
   providing information associated with the compression statistics to a statistical remultiplexer;
   wherein generating one or more compression statistics from the parsed compressed video data comprises:
      counting a number of motion vectors in the parsed compressed video data for a plurality of macroblocks in a picture; and
      generating one or more correlation measures corresponding to the picture based on the number of motion vectors in the picture;
   wherein generating one or more compression statistics from the parsed compressed video data further comprises:
   counting a number of motion vectors in a backward direction with respect to the picture;
   wherein generating one or more correlation measures is based on the number of motion vectors in the picture and the number of motion vectors in the backward direction with respect to the picture.

* * * * *